(12) United States Patent
Fuchida

(10) Patent No.: US 6,742,070 B2
(45) Date of Patent: *May 25, 2004

(54) FUNCTION-EXPANSION DEVICE DETACHABLY CONNECTING ELECTRONIC EQUIPMENT

(75) Inventor: Hidehiko Fuchida, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,006

(22) Filed: Aug. 16, 1999

(65) Prior Publication Data

US 2003/0110333 A1 Jun. 12, 2003

(30) Foreign Application Priority Data

Sep. 14, 1998 (JP) .......................................... 10-260604

(51) Int. Cl.$^7$ ................................................ G06F 1/16
(52) U.S. Cl. ..................... 710/303; 710/63; 361/731; 307/50
(58) Field of Search .............................. 710/1–2, 9–19, 710/100–106, 129–131, 300–304, 62–63, 72; 361/679–686, 6, 727, 724–737; 307/150; 713/300

(56) References Cited

U.S. PATENT DOCUMENTS

| | | | | |
|---|---|---|---|---|
| 5,265,238 A | * | 11/1993 | Canova et al. ................... 713/1 |
| 5,323,291 A | * | 6/1994 | Boyle et al. ................. 361/686 |
| 5,434,743 A | * | 7/1995 | Hosoya et al. ............... 361/686 |
| 5,535,093 A | * | 7/1996 | Noguchi et al. ............. 361/686 |
| 5,664,119 A | | 9/1997 | Jeffries et al. ............... 710/302 |
| 5,805,412 A | * | 9/1998 | Yanagisawa et al. ........ 361/686 |
| 5,847,543 A | * | 12/1998 | Carroll ........................ 320/125 |
| 5,867,406 A | * | 2/1999 | Yanagisawa ................. 708/140 |
| 5,911,042 A | * | 6/1999 | Kugue ......................... 713/202 |
| 5,911,777 A | * | 6/1999 | Heredia ....................... 713/200 |
| 5,941,965 A | * | 8/1999 | Moroz et al. ................ 710/101 |
| 5,955,797 A | * | 9/1999 | Kim ............................ 307/150 |
| 5,968,187 A | * | 10/1999 | Robinson ...................... 714/25 |
| 5,974,556 A | * | 10/1999 | Jackson et al. .............. 713/322 |
| 5,991,838 A | * | 11/1999 | Swindler et al. ............ 710/101 |
| 5,991,839 A | * | 11/1999 | Ninomiya .................... 710/101 |
| 6,119,184 A | * | 9/2000 | Takahama .................... 710/101 |
| 6,119,237 A | * | 9/2000 | Cho ............................. 713/300 |
| 6,134,615 A | * | 10/2000 | Chari et al. ................. 710/103 |
| 6,151,218 A | * | 11/2000 | Pirdy et al. .................. 361/727 |
| 6,178,469 B1 | * | 1/2001 | Hennessy et al. ............... 710/9 |
| 6,246,575 B1 | * | 6/2001 | Barrus et al. ................ 361/686 |
| 6,484,265 B2 | * | 11/2002 | Borkar et al. ................ 713/324 |

FOREIGN PATENT DOCUMENTS

| | | |
|---|---|---|
| DE | 29510291 U1 | 8/1995 |
| JP | 4-186411 | 7/1992 |
| JP | 5-233109 | 9/1993 |
| JP | 9-97125 | 4/1997 |

OTHER PUBLICATIONS

Rowell, D., "Dock and Play–Almost", Byte, vol. 21, No. 4, Apr. 1, 1996, pp. 91–93, 96, 98.

* cited by examiner

Primary Examiner—Christopher B. Shin
(74) Attorney, Agent, or Firm—Staas & Halsey LLP

(57) ABSTRACT

A function-expansion device is detachably connected to electronic equipment to expand functions of the electronic equipment. The function-ezpansion device includes a component unit which provides an extended function of the electronic equipment. A docking station detachably mounts the component unit on the docking station, the docking station connecting the component unit to the electronic equipment. The component unit is detachable from the docking station when the docking station is attached to the electronic equipment which is in an operating condition.

22 Claims, 26 Drawing Sheets

QPCIEN#

| PCI BUS CONNECTION STATE | POWER OFF | PCI BUS ISOLATED | PCI BUS CONNECTED (DOCKED STATE) | PCI BUS ISOLATED |

FUNCTION-EXPANSION DEVICE DETACHABLY CONNECTING ELECTRONIC EQUIPMENT

BACKGROUND OF THE INVENTION (1). Field of the Invention

The present invention generally relates to a function-expansion device and electronic equipment, and more particularly to a function-expansion device and electronic equipment, the function-expansion device being detachably connected to the electronic equipment to provide extended functions of the electronic equipment.

(2). Description of the Related Art

FIG. 1 shows a conventional electronic equipment system. As shown in FIG. 1, the conventional electronic equipment system 1 includes a notebook PC (personal computer) 10 having a minimum number of functions needed, and an expansion station 20. The expansion station 20 is attached to the notebook PC 10 to expand the functions of the notebook PC 10.

The notebook PC 10 has a connector 11 on the bottom of the notebook PC 10, and the expansion station 20 has a connector 21 on the top of the expansion station 20 at a position corresponding to a position of the connector 11 on the notebook PC 10. When the expansion station 20 is attached to the notebook PC 10, the connector 11 and the connector 21 are connected to each other. In the expansion station 20, a floppy disk drive 22 and a CD-ROM drive 23 are provided. The floppy disk drive 22 acts to read information from or write information to a floppy disk 30. The CD-ROM drive 23 acts to read information from a CD-ROM 40. The functions of the floppy disk drive 22 and the CD-ROM drive 23, which require a relatively large amount of power consumption, are not provided on the notebook PC 10, and these functions are provided only when the expansion station 20 is attached to the notebook PC 10.

However, in the conventional electronic equipment system 1 of FIG. 1, the floppy disk drive 22 and the CD-ROM drive 23 are integrally provided on the expansion station 20 in a fixed manner. Hence, information recording media that can be used with the notebook PC 10 are limited to the floppy disk and the CD-ROM. Other recording media, such as magneto-optical disks (MO), digital video disks (DVD) or high-capacity floppy disks (LS-120), cannot be used with the notebook PC 10. The range of expansion of the functions provided by the expansion station 20 is restricted, and the conventional electronic equipment system 1 does not provide an adequate level of operability, or ease of use, for the user.

Further, in the conventional electronic equipment system 1, when the user intends to detach the expansion station 20 from the notebook PC 10, it is required to stop operation of the notebook PC 10 or turn off a power switch of the notebook PC 10. The conventional electronic equipment system 1 does not provide an adequate level of operability, or ease of use, for the user, even through the expansion station 20 provides extended functions of the notebook PC 10.

In addition, the conventional electronic equipment system 1 including the expansion station 20 is intended for the desktop use, and it is not intended to provide portability. As shown in FIG. 1, the expansion station 20 has a size that is equivalent to a size of the notebook PC 10. It is difficult for the user to carry the notebook PC 10 with the expansion station 20 attached thereto. The conventional electronic equipment system 1 including the expansion station 20 is not easily portable, which may cause inconvenience to the user.

SUMMARY OF THE INVENTION

An object of the present invention is to provide an improved function-expansion device in which the above-mentioned problems are eliminated.

Another object of the present invention is to provide a function-expansion device which provides an adequate level of operability for the user and includes a component unit detachable from the function-expansion device when the function-expansion device is connected to electronic equipment which is in an operating condition.

Still another object of the present invention is to provide an electronic equipment system including a function-expansion device which provides an adequate level of operability for the user and includes a component unit detachable from the function-expansion device when the function-expansion device is connected to electronic equipment which is in an operating condition.

The above-mentioned objects of the present invention are achieved by a function-expansion device detachably connected to electronic equipment to expand functions of the electronic equipment, the function-expansion device including: a component unit which provides an extended function of the electronic equipment; and a docking station which detachably mounts the component unit on the docking station, the docking station connecting the component unit to the electronic equipment, wherein the component unit is detachable from the docking station when the docking station is attached to the electronic equipment which is in an operating condition.

The above-mentioned objects of the present invention are achieved by an electronic equipment system including a function-expansion device and electronic equipment, the function-expansion device detachably connected to the electronic equipment to expand functions of the electronic equipment, the function-expansion device including: a component unit which provides an extended function of the electronic equipment; and a docking station which detachably mounts the component unit on the docking station, the docking station connecting the component unit to the electronic equipment, wherein the component unit is detachable from the docking station when the docking station is attached to the electronic equipment which is in an operating condition.

In the function-expansion device of the present invention, the component unit is detachable from the docking station when the function-expansion device is connected to the electronic equipment which is in an operating condition. When the component unit in the function-expansion device is exchanged for a new component unit, it is not necessary to stop operation of the electronic equipment or turn off a power switch of the electronic equipment. It is possible to exchange the component unit for the new component unit even when the electronic equipment is operating. The function-expansion device of the present invention is effective in providing an adequate level of operability for the user.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
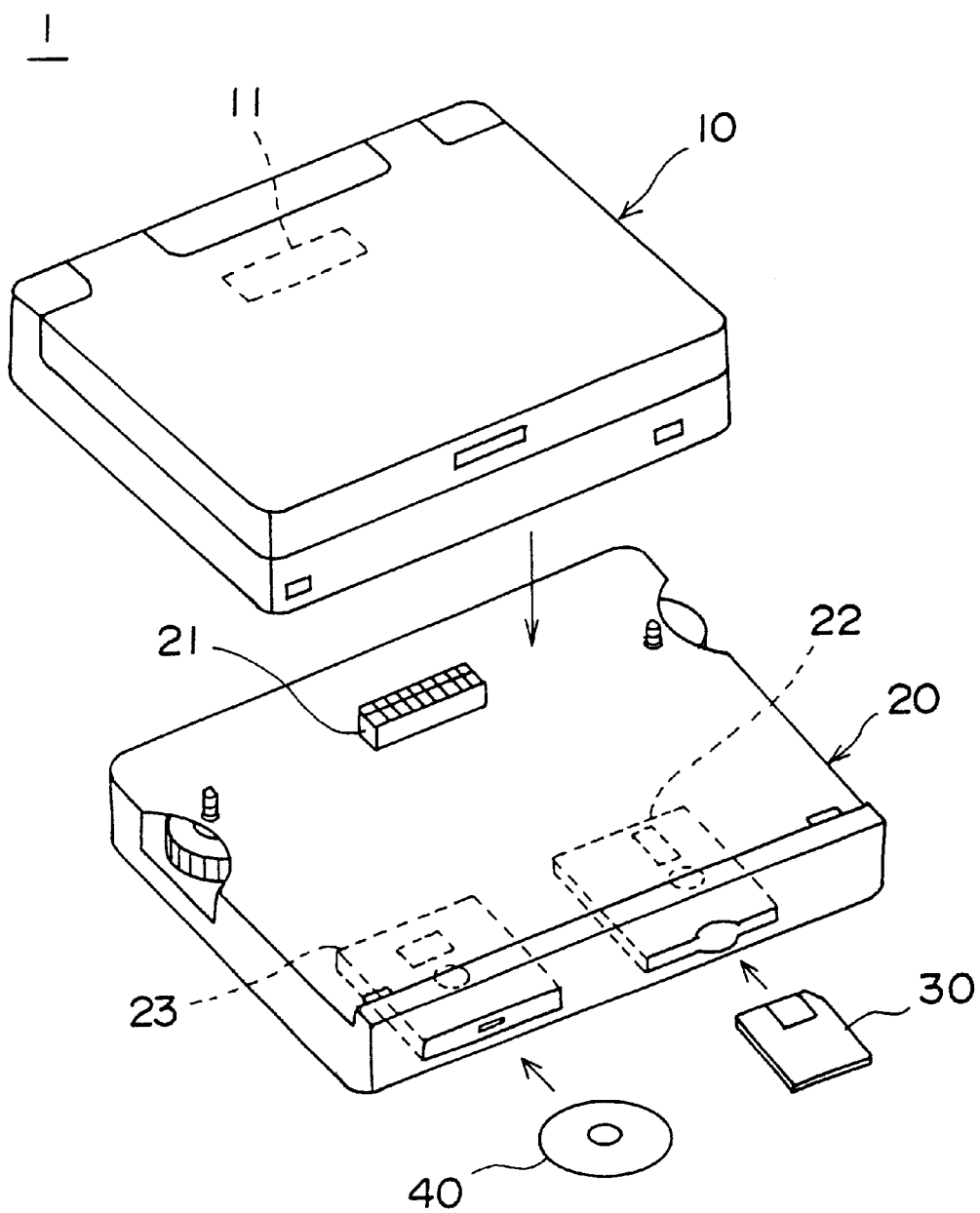
FIG. 1 is a diagram for explaining a conventional electronic equipment system.
Figure 2:
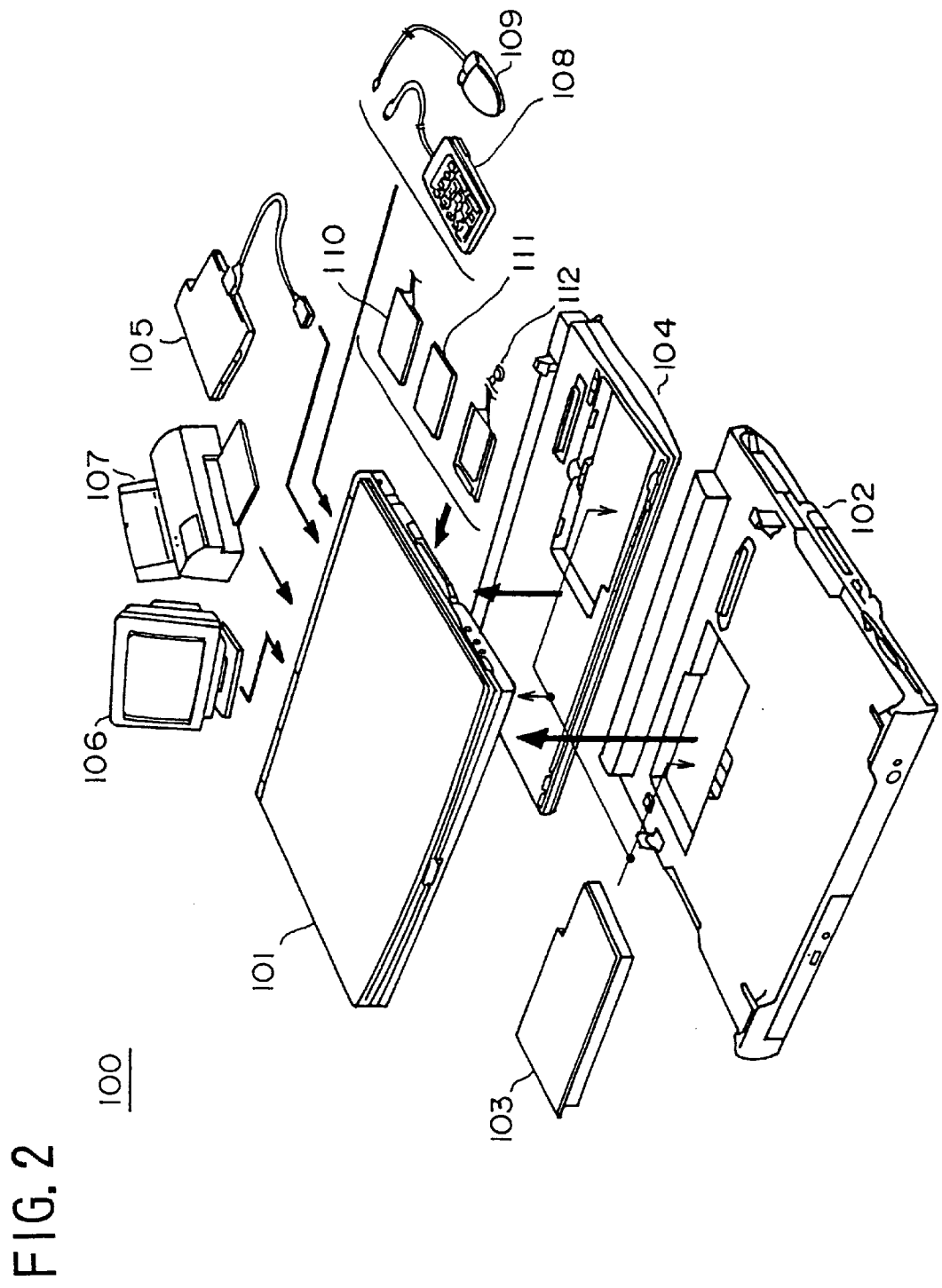
FIG. 2 is a diagram for explaining an electronic equipment system embodying the present invention.

FIG. 2 shows a configuration of an electronic equipment system embodying the present invention.

As shown in FIG. 2, an electronic equipment system 100 in the present embodiment generally has a notebook PC (personal computer) 101, an expansion station 102, a built-in battery pack 103, a compact bay case 104, and a floppy disk drive unit 105. The expansion station 102 constitutes a detachable docking station in the function-expansion device of the present invention. The compact bay case 104 constitutes another detachable docking station in the function-expansion device of the present invention. The battery pack 103 includes a first battery and a second battery. The floppy disk drive unit 105 is externally connected to the notebook PC 101.

In the electronic equipment system 100 of FIG. 2, a color CRT (cathode-ray tube) display 106, a printer 107, a ten-key board 108 and a mouse 109 can be externally connected to the notebook PC 101. Further, a variety of PC cards which are in conformity with PCMCIA (Personal Computer Memory Card International Association) standard can be externally connected to the notebook PC 101. The above-mentioned PC cards include an SCSI (small computer system interface) card 110, an IC (integrated circuit) memory card 111 and an LAN (local area network) card 112.

Figure 3:
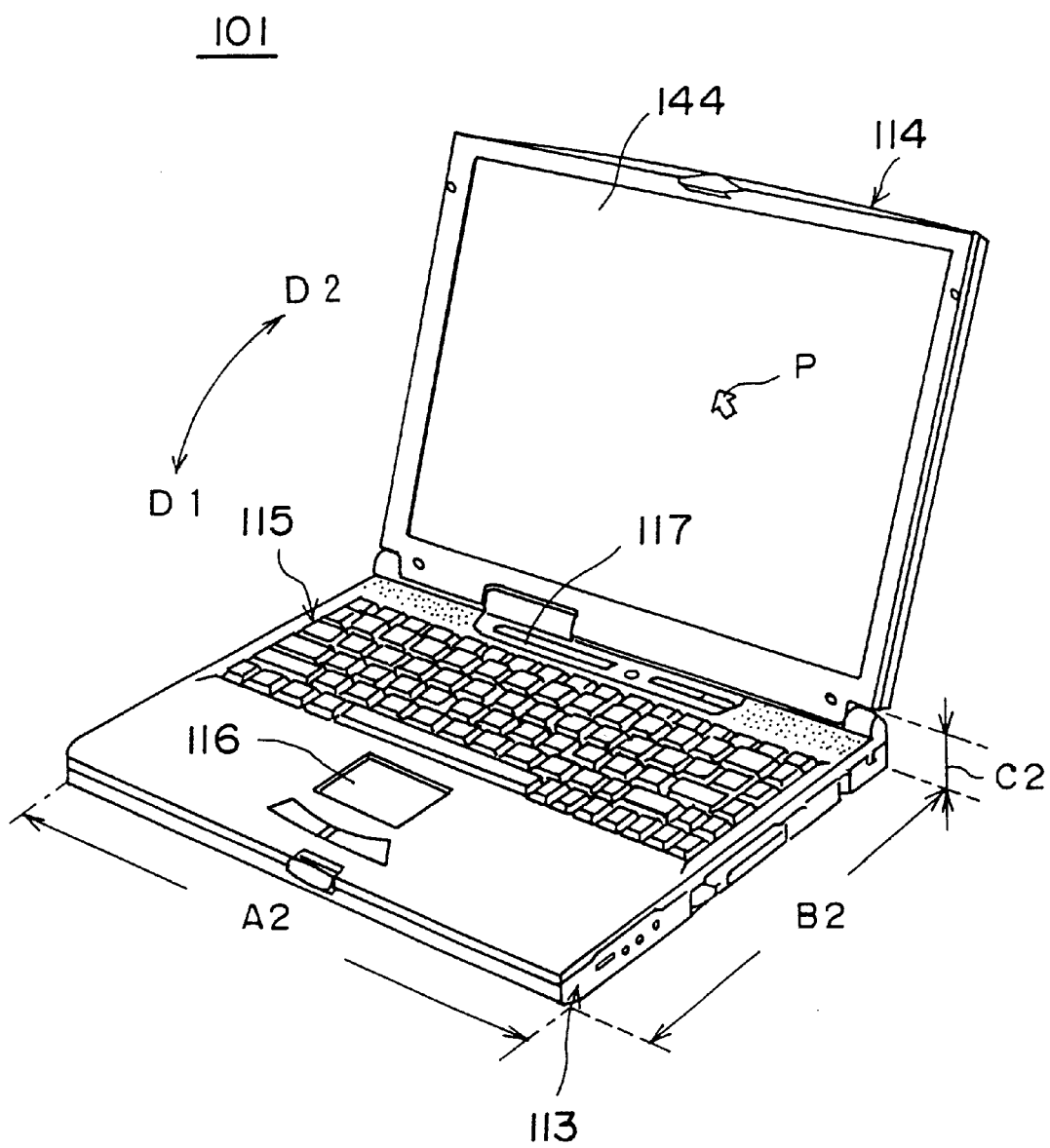
FIG. 3 is a perspective view of a notebook PC in the electronic equipment system.
Figure 4A:
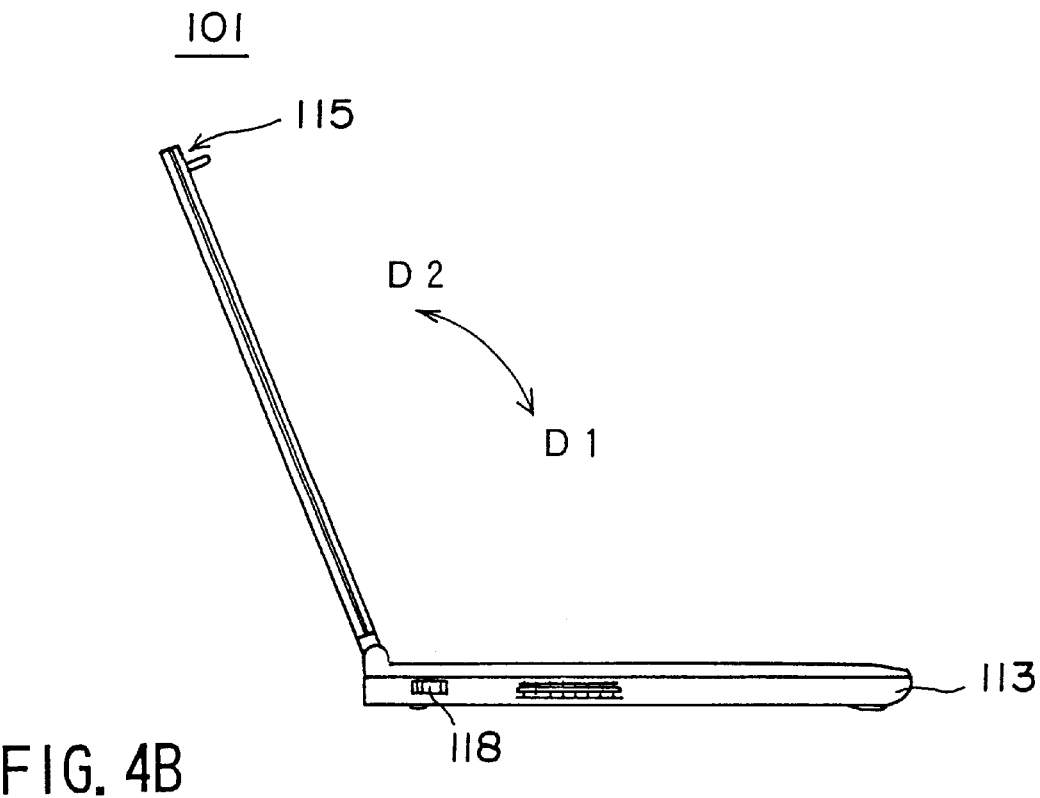
FIG. 4A and FIG. 4B are diagrams showing a left side and a right side of the notebook PC in the electronic equipment system.
Figure 4B:
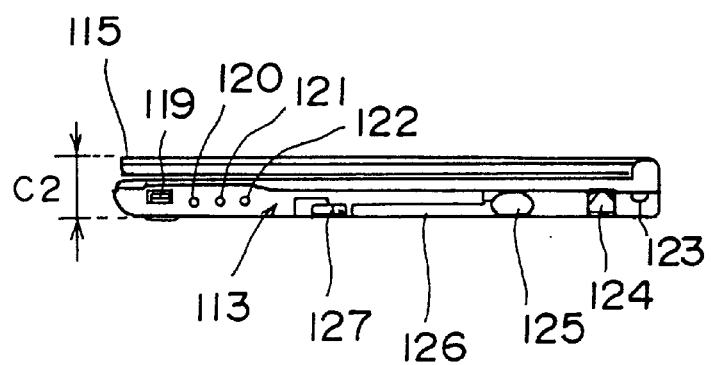
Figure 5A:
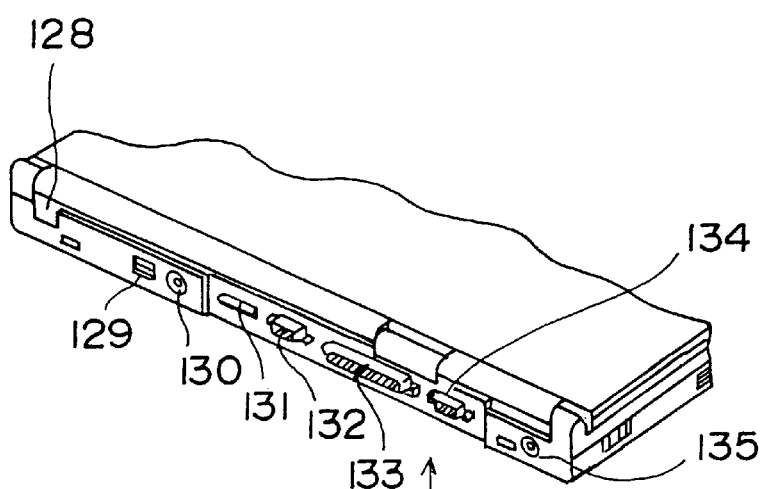
FIG. 5A and FIG. 5B are diagrams showing a back and a bottom of the notebook PC in the electronic equipment system.
Figure 5B:
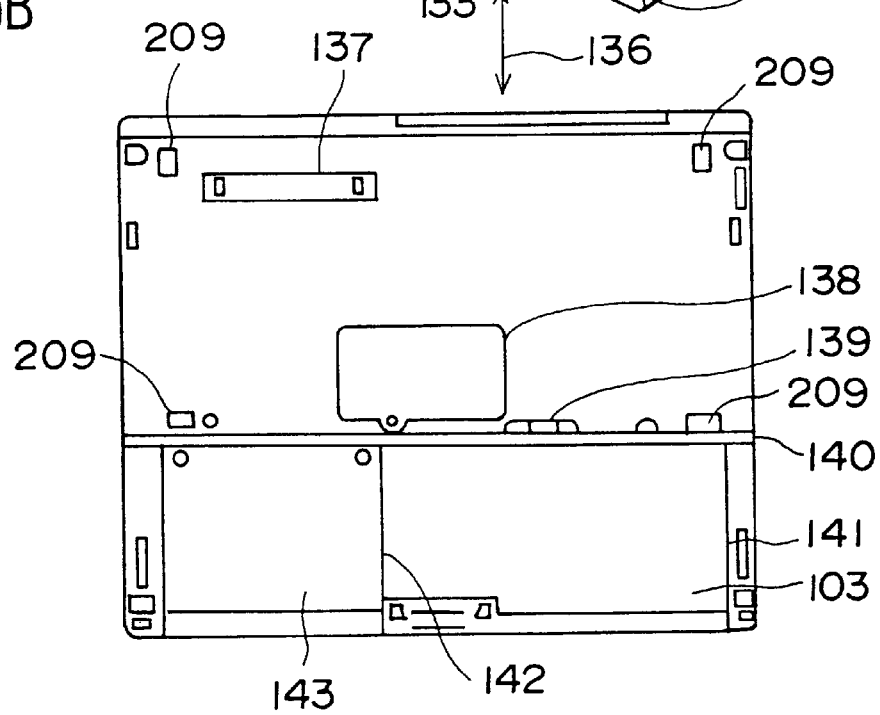

FIG. 3 shows the notebook PC 101 in the electronic equipment system 100. FIG. 4A shows a left side of the notebook PC 101, and FIG. 4B shows a right side of the notebook PC 101. FIG. 5A shows a back of the notebook PC 101, and FIG. 5B shows a bottom of the notebook PC 101.

A description will now be given of the notebook PC 101 in the electronic equipment system 100 of the present embodiment.

The notebook PC 101 generally has a host PC 113 and a display part 114. The display part 114 is rotatably supported on the host PC 113. The display part 114 is rotatable on the host PC 113 in directions indicated by the arrows D1 and D2 in FIG. 3. When the notebook PC 101 is carried by the user, the display part 114 is rotated on the host PC 113 in the direction D1. The host PC 113 is fully covered by the display part 114, and they are placed in a flat condition as shown in FIG. 4B.

When the notebook PC 101 is used by the user, the display part 114 is rotated on the host PC 113 in the direction D2. Internal surfaces of the host PC 113 and the display part 114 are uncovered as shown in FIG. 4A, and the notebook PC 101 can operate in this condition.

When the notebook PC 101 is set in the condition shown in FIG. 3, a keyboard 115 and a pointing device 116 on the top of the host PC 113 are uncovered. During operation of the notebook PC 101, the user can input a command and data to the notebook PC 101 by using the keyboard 115, and can move a pointer "P" on the monitor of the display part 114 by using the pointing device 116. An operating state indicator 117 is provided at a rear position on the top of the host PC 113. The operating state indicator 117 provides an indication of an operating state of the notebook PC 101.

As shown in FIG. 4A, a power switch 118 is provided on the left side of the host PC 113. When the power switch 118 is turned on or off, the operation of the notebook PC 101 is started or terminated.

As shown in FIG. 4B, a volume control 119, a headphone jack 120, a microphone jack 121, a LINE-IN jack 122, an anti-theft lock 123, a modular connector 124, a PC card lock 125, a PC card slot 126 and a PC card eject button 127 are provided on the right side of the host PC 113.

The volume control 119 acts to adjust the volume of a ringing signal or a sound signal. A headphone (not shown) is connected to the headphone jack 120. A microphone (not shown) is connected to the microphone jack 121. A sound input connector (not shown) is connected to the LINE-IN jack 122, and a sound signal output by an external device is supplied through the sound input connector to the notebook PC 101. An anti-theft cable (not shown) is connected to the anti-theft lock 123. A telephone line connecting jack (not shown) is connected to the modular jack 124. Any of the PC cards, including the SCSI card 110, the IC memory card 111 and the LAN card 112, is inserted into the PC card slot 126. The PC card lock 125 acts to lock the inserted PC card in the PC card slot 126 and prevent separation of the PC card from the PC card slot 126.

As shown in FIG. 5A, an infrared communication port 128, a USB (universal serial bus) connector 129, an expansion keyboard/mouse connector 130, a floppy disk drive connector 131, a serial interface connector 132, a parallel interface connector 133, a CRT interface connector 134, a DC-IN connector 135 and an expansion connector cover 136 are provided on the back of the host PC 113.

The infrared communication port 128 provides an interface needed to perform an infrared communication. A peripheral device (not shown) which is in conformity with USB (universal serial bus) standard is connected to the USB connector 129. The ten-key board 108 or the mouse 109 is connected to the expansion keyboard/mouse connector 130. The floppy disk drive unit 105 is connected to the floppy disk drive connector 131. An external device (not shown) having an interface in conformity with RS-232C standard is connected to the serial interface connector 132. The printer 107 or the like is connected to the parallel interface connector 133. The color CRT display 106 is connected to the CRT interface connector 134. An AC adapter (not shown) which externally supplies source power to the notebook PC 101 is connected to the DC-IN connector 135. The expansion connector cover 136 provides protection for the connectors on the back of the host PC 113 when the notebook PC 101 is carried by the user.

As shown in FIG. 5B, an expansion unit connector 137, an expansion RAM (random access memory) slot 138, a built-in battery pack lock 139, an unlock button 140, a built-in battery pack slot 141 and a built-in hard disk drive slot 142 are provided on the bottom of the notebook PC 101.

The expansion station 102 and the compact bay case 104 are connected to the expansion unit connector 137. An expansion RAM module (not shown) is inserted into the expansion RAM slot 138. The battery pack lock 139 acts to lock the battery pack 103 in the battery pack slot 141 when the battery pack 103 is inserted into the battery pack slot 141. The unlock button 140 acts to unlock the battery pack 103. The battery pack 103 is inserted into the battery pack slot 141. A built-in hard disk drive unit 143 is inserted into the hard disk drive slot 142.

Further, as shown in FIG. 3, a liquid crystal display 144 is provided on the internal surface of the display part 114, and an image is displayed on the liquid crystal display 144. The notebook PC 101 includes a CPU, a RAM, a ROM, an interface circuit and a communication circuit which are incorporated in the host PC 113, and these elements enable the notebook PC 101 to carry out information processing.

Figure 6:
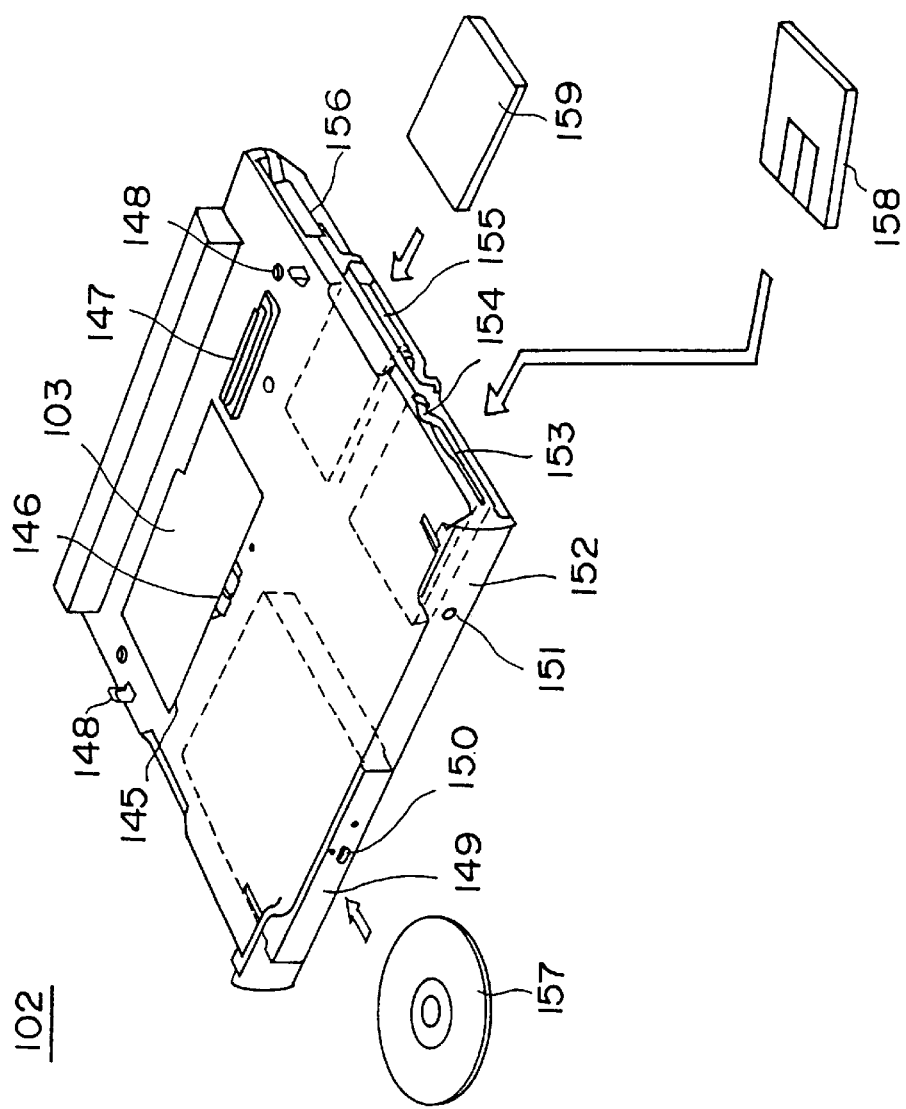
FIG. 6 is a perspective view of an expansion station in the electronic equipment system.
Figure 7:
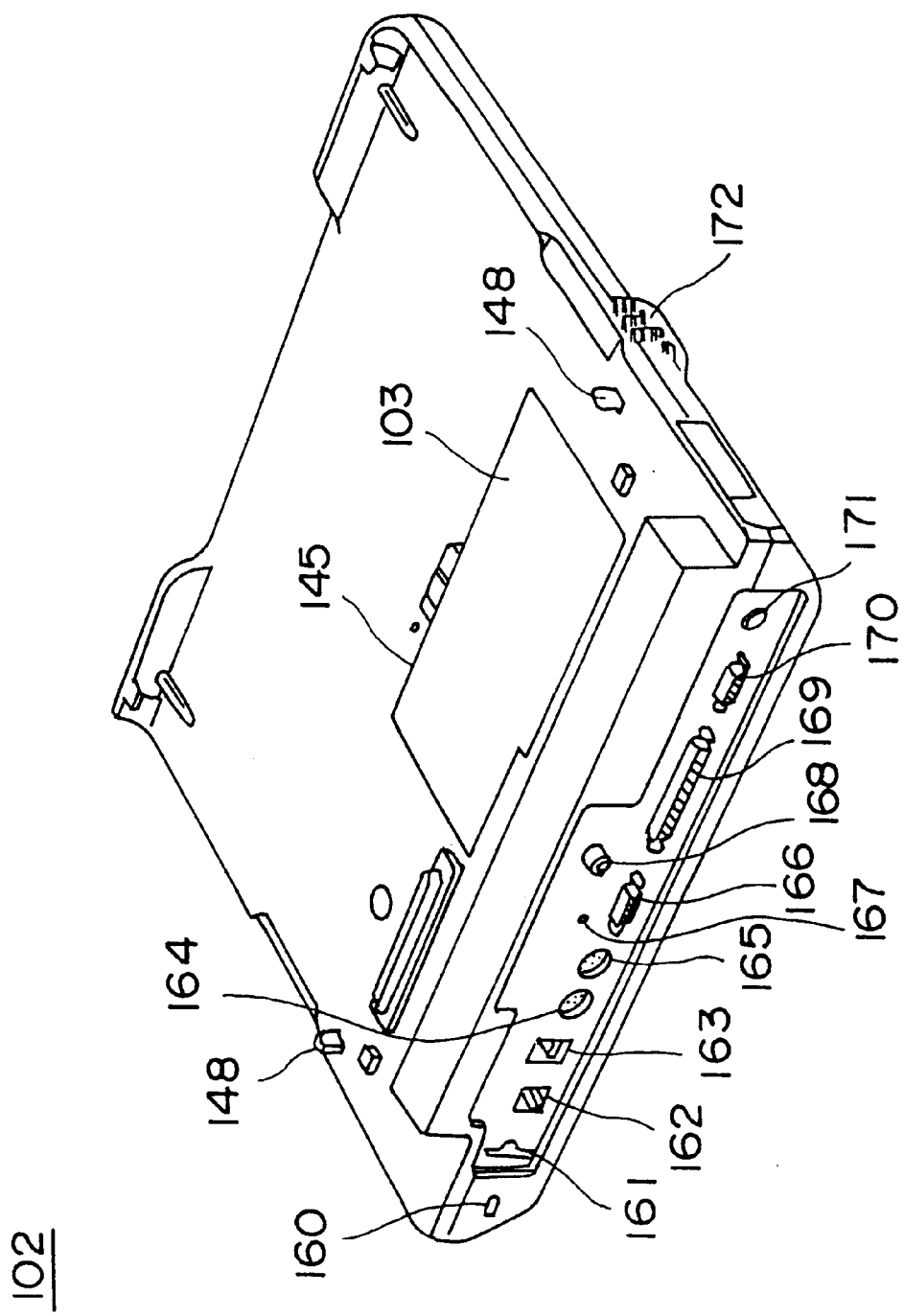
FIG. 7 is a diagram showing a back of the expansion station in the electronic equipment system.

FIG. 6 shows the expansion station 102 in the electronic equipment system 100 of the present embodiment. FIG. 7 shows a back of the expansion station 102 in the electronic equipment system 100.

A description will now be given of the expansion station 102 in the electronic equipment system 100 of the present embodiment.

As shown in FIG. 6, a built-in battery pack slot 145, a built-in battery pack lock 146, a connector 147, connector locks 148, a CD-ROM drive 149, a CD-ROM eject button 150, a release button 151, a release enable lamp 152, a floppy disk drive 153, a floppy disk eject button 154, a PC card slot 155 and a release lever 156 are provided on the expansion station 102.

The battery pack 103 is inserted into the battery pack slot 145. The battery pack slot 145 is provided for mounting the battery pack 103 on the expansion station 102, and the battery pack 103 supplies power to the expansion station 102 and the notebook PC 101. The battery pack lock 146 acts to lock the battery pack 103 in the battery pack slot 145. The connector 147 is connected to the expansion unit connector 137 on the bottom of the host PC 113, so that the expansion station 102 and the host PC 113 are connected to each other. The connector locks 148 are fitted to recessed portions 209 (FIG. 5B) of the bottom of the host PC 113, so that the expansion station 102 is mechanically connected to the host PC 113. A CD-ROM 157 is inserted into the CD-ROM drive 149, and the CD-ROM drive 149 acts to read information from the CD-ROM 157. The CD-ROM eject button 150 acts to eject the CD-ROM 157 from the CD-ROM drive 149. The release button 151 acts to release the expansion station 102 from the notebook PC 101. The release enable lamp 152 is comprised of an LED (light emitting diode). The release enable lamp 152 is turned on when the notebook PC 101 is set in a condition that the expansion station 102 can be removed from the notebook PC 101. A floppy disk 158 is inserted into the floppy disk drive 153, and the floppy disk drive 153 acts to read information from or write information to the floppy disk 158. The floppy disk eject button 154 acts to eject the floppy disk 158 from the floppy disk drive 153. A PC card 159 is inserted into the PC card slot 155. The release lever 156 is pulled by the user before the expansion station 102 is released from the notebook PC 101. The release lever 156 acts to release the mechanical connection between the notebook PC 101 and the expansion station 102.

As shown in FIG. 7, an anti-theft lock 160, a security lock 161, an LAN connector 162, a USB connector 163, an expansion keyboard connector 164, a mouse connector 165, a serial interface connector 166, a sound output terminal 167, a video output terminal 168, a parallel interface connector 169, a CRT connector 170, a DC-IN connector 171 and ventilation holes 172 are provided on the back and the side of the expansion station 102.

An anti-theft cable (not shown) is connected to the anti-theft lock 160. The security lock 161 acts to lock the connection of the anti-theft cable and the anti-theft lock 160 when the anti-theft cable is fixed to the anti-theft lock 160.

An LAN cable (not shown) is connected to the LAN connector 162. A peripheral device (not shown) which is in conformity with USB standard is connected to the USB connector 163. The ten-key board 108 is connected to the expansion keyboard connector 164. The mouse 109 is connected to the mouse connector 165. An external device (not shown) having an interface in conformity with RS-232C standard is connected to the serial interface connector 166. A speaker (not shown) or the like is connected to the sound output terminal 167. A sound signal is output from the sound output terminal 167. A video board (not shown) or the like is connected to the video output terminal 168. A video signal is output from the video output terminal 168. A printer or the like having a parallel port is connected to the parallel interface connector 169. The CRT display 106 is connected to the CRT connector 170. An AC adapter (not shown) which externally supplies source power to the expansion station 102 is connected to the DC-IN connector 171. The ventilation holes 172 act to circulate air within the expansion station 102 so as to cool the inside of the expansion station 102.

When the AC adapter is connected to the expansion station 102, the source power can be externally supplied to the expansion station 102 by the AC adapter. When the battery pack 103 is inserted into the battery pack slot 145, power from the battery pack 103 can be supplied to the expansion station 102. In addition, the battery pack 103 inserted into the battery pack slot 145 can be recharged with the source power supplied by the AC adapter.

Figure 8:
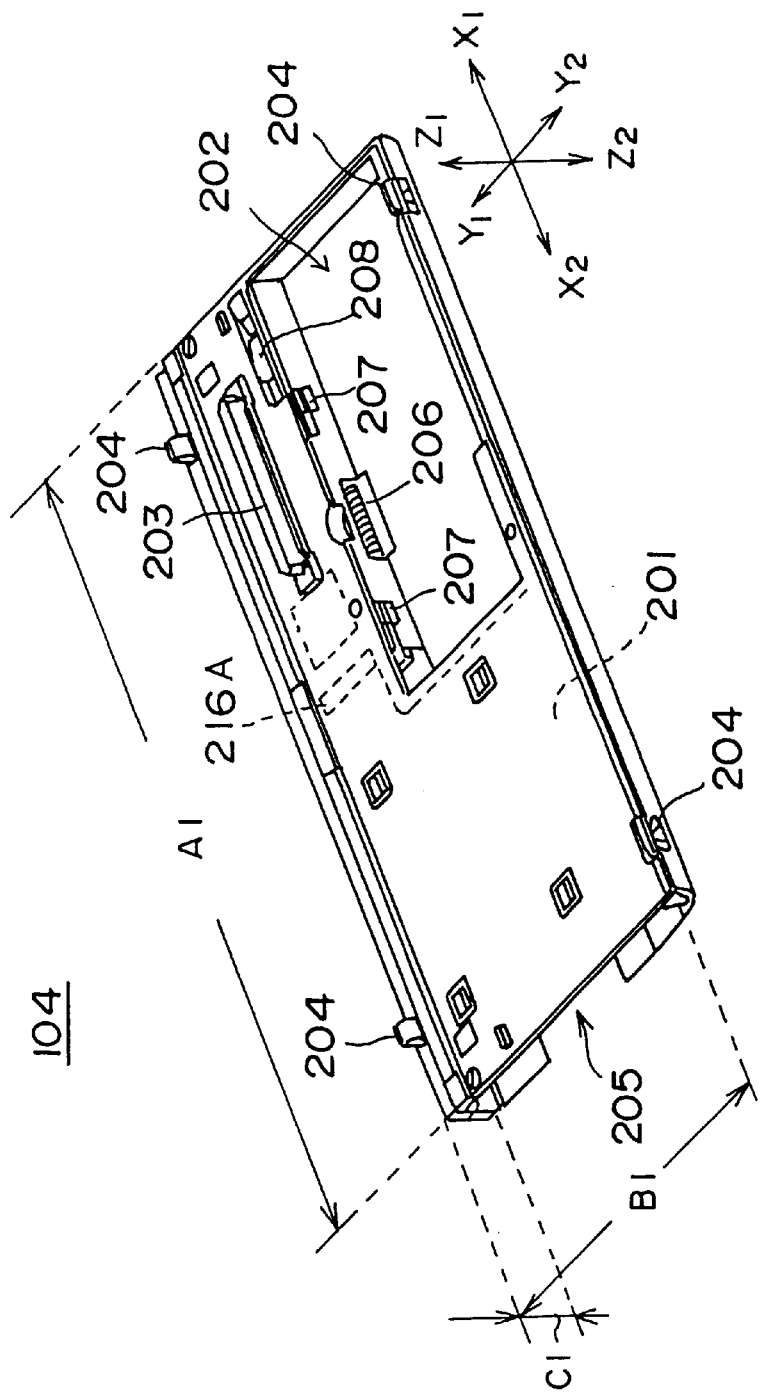
FIG. 8 is a perspective view of a compact bay case in the electronic equipment system.
Figure 9:
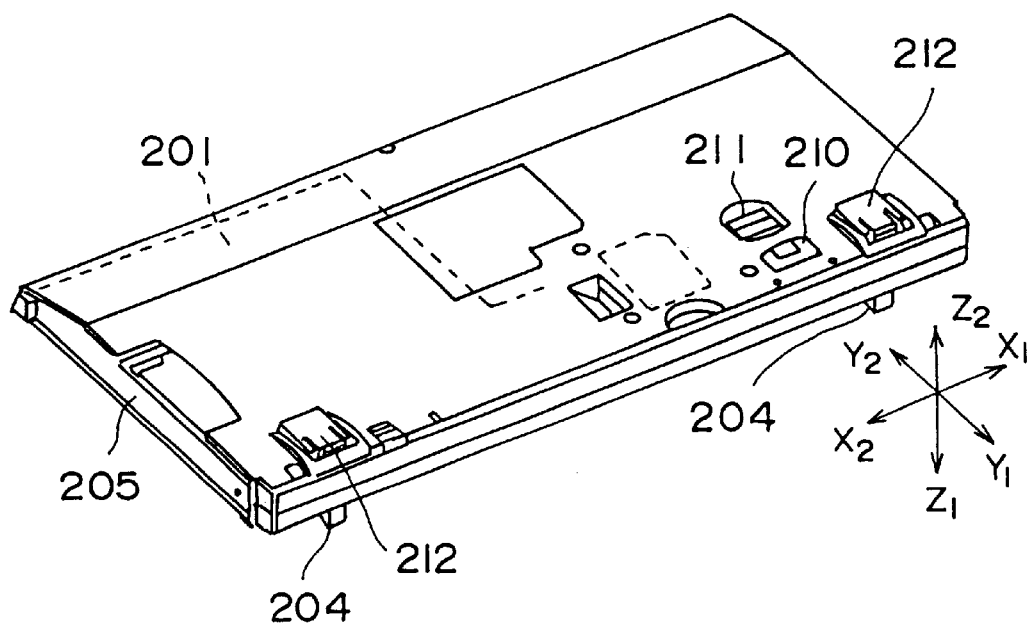
FIG. 9 is a diagram showing a bottom of the compact bay case in the electronic equipment system.
Figure 10:
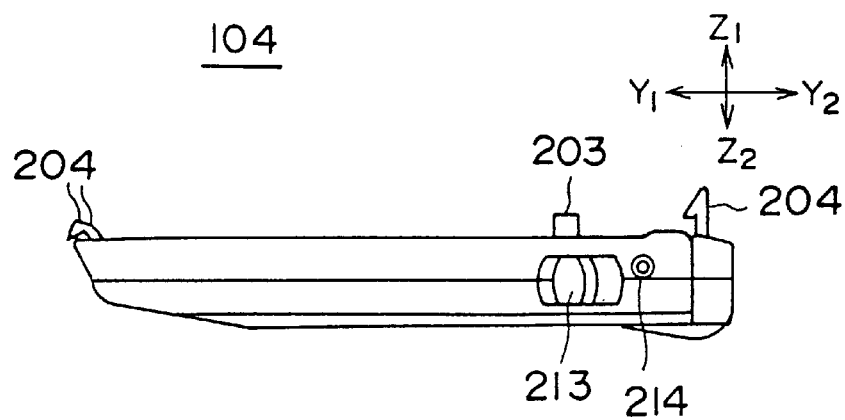
FIG. 10 is a side view of the compact bay case in the electronic equipment system.

FIG. 8 shows the compact bay case 104 in the electronic equipment system 100. FIG. 9 shows a bottom of the compact bay case 104 in the electronic equipment system 100. FIG. 10 shows a side of the compact bay case 104 in the electronic equipment system 100.

In the accompanying drawings, including FIG. 8, FIG. 9 and FIG. 10, the arrow X1 indicates a left direction of the notebook PC 101, the arrow X2 indicates a right direction of the notebook PC 101, the arrow Y1 indicates a rear direction of the notebook PC 101, the arrow Y2 indicates a front direction of the notebook PC 101, the arrow Z1 indicates an upward direction of the notebook PC 101, and the arrow Z2 indicates a downward direction of the notebook PC 101.

A description will now be given of the compact bay case 104 in the electronic equipment system 100 of the present embodiment.

The compact bay case 104 has a length "A1" which is equivalent to a length "A2" of the notebook PC 101, a width "B1" which is approximately half of a width "B2" of the notebook PC 101, and a height "C1" which is equivalent to a height "C2" of the notebook PC 101. The compact bay case 104 is remarkably small in size. The compact bay case 104 is approximately half as large as the notebook PC 101. The compact bay case 104 is provided in a flat rectangular formation. The notebook PC 101 with the compact bay case 104 attached thereto is easily portable.

As shown in FIG. 8, the compact bay case 104 generally has an expansion bay 201, a battery pack slot 202, a connector 203, and lugs 204. The expansion bay 201 includes an insertion opening 205 on the left side of the compact bay case 104. An optional component unit, such as a floppy disk drive unit or a CD-ROM drive unit, is inserted through the insertion opening 205 into the expansion bay 201, and the inserted component unit provides an extended function of the notebook PC 101. The floppy disk drive unit and the CD-ROM drive unit which are provided as the optional component unit on the compact bay case 104 will be described later.

The battery pack slot 202 is provided on the top of the compact bay unit 104. The battery pack 103 is inserted into the battery pack slot 202, and the battery pack 103 supplies power to the optional component unit on the compact bay case 104 and to the notebook PC 101. In the battery pack slot 202, a connector 206 and connecting portions 207 are provided. The connector 206 is electrically connected to the battery pack 103 when inserted into the battery pack slot 202. The connecting portions 207 act to lock the battery pack 103 to the battery pack slot 202 when inserted. An operation lever 208 is provided on the periphery of the battery pack slot 202. When the operation lever 208 is manipulated by the user, the battery pack 103 is unlocked from the connecting portions 207.

The connector 203 on the top of the compact bay case 104 is connected to the connector 137 on the bottom of the notebook PC 101 when the compact bay case 104 is attached to the notebook PC 101. The compact bay case 104 electrically connects the optional component unit to the notebook PC 101 through the connection of the connector 203 and the connector 137. The lugs 204 on the top of the compact bay case 104 are fitted to the recessed portions 209 on the bottom of the notebook PC 101. The compact bay unit 104 is mechanically connected to the notebook PC 101 by the connection of the lugs 204 and the recessed portions 209.

As shown in FIG. 9, an operation button 210 which is engaged with the lugs 204 is provided on the bottom of the compact bay case 104. When the operation button 210 is pressed by the user, the lugs of the compact bay case 104 are released from the recessed portions 209 of the notebook PC 101. Hence, when the user intends to detach the compact bay case 104 from the notebook PC 101, the user presses the operation button 210.

A lock lever 211 is provided on the bottom of the compact bay case 104 adjacent to the operation button 210. The lock lever 211 is manipulated by the user to lock the operation button 210 at its locked position. The lock lever 211 acts to prevent erroneous detachment of the compact bay case 104 from the notebook PC 101 when the operation button 210 is erroneously touched by the user.

A pair of leg portions 212 are provided on the bottom of the compact bay case 104, and the leg portions 212 are rotatably supported on hinges such that the leg portions 212 are rotatable between a retracted position and a raised position. When the leg portions 212 on the bottom of the compact bay case 104 are set at the raised position, the keyboard 115 on the internal surface of the notebook PC 101 can be placed in a slanted condition.

As shown in FIG. 10, an undocking request button 213 and an undocking indicator 214 are provided on the side of the compact bay case 104. The undocking indicator 214 is comprised of an LED (light emitting diode). The undocking request button 213 is pressed by the user, and the undocking request button 213 at that time acts to activate an undocking request generating unit (which will be described later) which requests the notebook PC 101 to permit detachment of the compact bay case 104 from the notebook PC 101. The undocking indicator 214 is turned on to provide an indication that the detachment of the compact bay case 104 from the notebook PC 101 is permitted by the notebook PC 101.

Figure 11A:
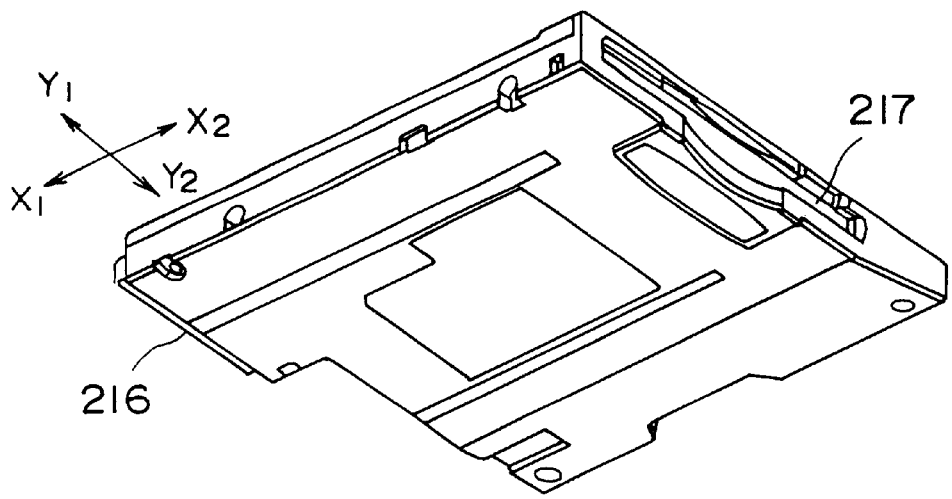
FIG. 11A and FIG. 11B are diagrams of a floppy disk drive unit which is an optional component unit mounted on the compact bay case.
Figure 11B:
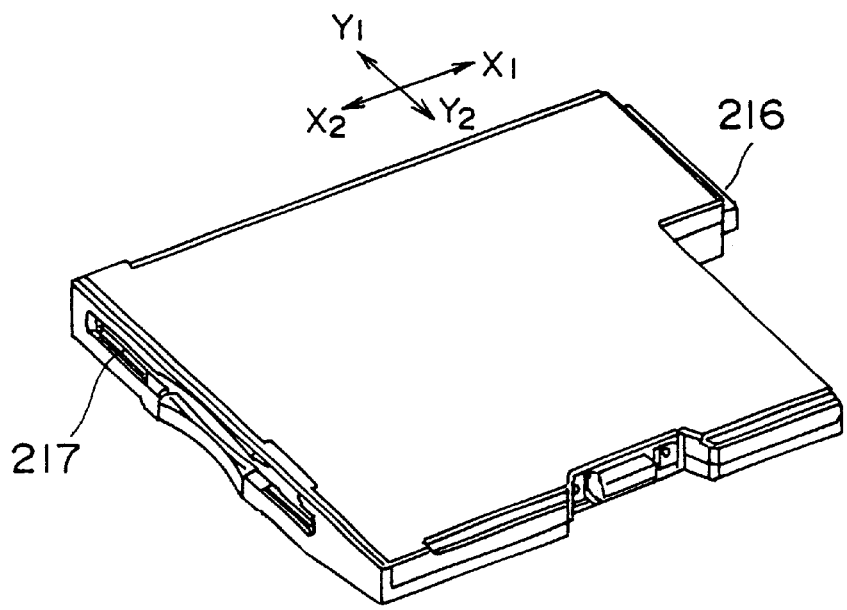

FIG. 11A and FIG. 11B show a floppy disk drive unit 215 which is an optional component unit mounted on the compact bay case 104. FIG. 11A shows a bottom of the floppy disk drive unit 215, and FIG. 11B shows a top of the floppy disk drive unit 215.

The floppy disk drive unit 215 is inserted in the direction X1 through the insertion opening 205 of the compact bay case 104 into the expansion bay 201. The inserted floppy disk drive unit 215 provides an extended function of the notebook PC 101. The floppy disk drive unit 215 includes, as shown in FIG. 11A and FIG. 11B, a connector 216 and a floppy disk insertion opening 217. As shown in FIG. 8, the compact bay case 104 includes a connector 216A provided at an end of the expansion bay 201. When the floppy disk drive unit 215 is mounted in the expansion bay 201 of the compact bay case 104, the connector 216 is connected to the connector 216A, so that the floppy disk drive unit 215 and the notebook PC 101 are interconnected by the connection of the connector 216 and the connector 216A. Further, when the floppy disk drive unit 215 is mounted in the expansion bay 201, the floppy disk insertion opening 217 is located at the insertion opening 205 of the compact bay case 104. A floppy disk (not shown) can be easily inserted into or withdrawn from the floppy disk drive unit 215 through the floppy disk insertion opening 216.

Figure 12:
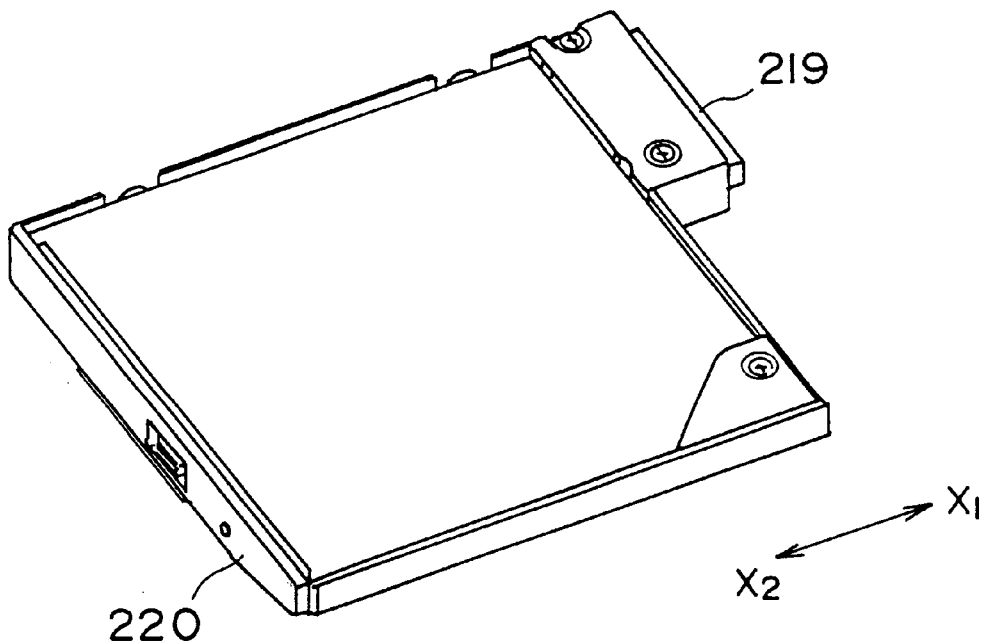
FIG. 12 is a perspective view of a CD-ROM drive unit which is another optional component unit mounted on the compact bay case.

FIG. 12 shows a CD-ROM drive unit 218 which is another optional component unit mounted on the compact bay case 104.

The CD-ROM drive unit 218 is inserted in the direction X1 through the insertion opening 205 of the compact bay case 104 into the expansion bay 201. The inserted CD-ROM drive unit 218 provides an extended function of the notebook PC 101. The CD-ROM drive unit 218 includes, as shown in FIG. 12, a connector 219 and a CD-ROM insertion part 220. When the CD-ROM drive unit 218 is mounted in the expansion bay 201 of the compact bay case 104, the connector 219 is connected to the connector 216A, so that the CD-ROM drive unit 218 and the notebook PC 101 are interconnected by the connection of the connector 219 and the connector 216A. Further, when the CD-ROM drive unit 218 is mounted in the expansion bay 201, the CD-ROM insertion part 220 is located at the insertion opening 205 of the compact bay case 104. A CD-ROM (not shown) can be easily inserted into or withdrawn from the CD-ROM drive unit 218 through the CD-ROM insertion part 220.

Figure 13A:
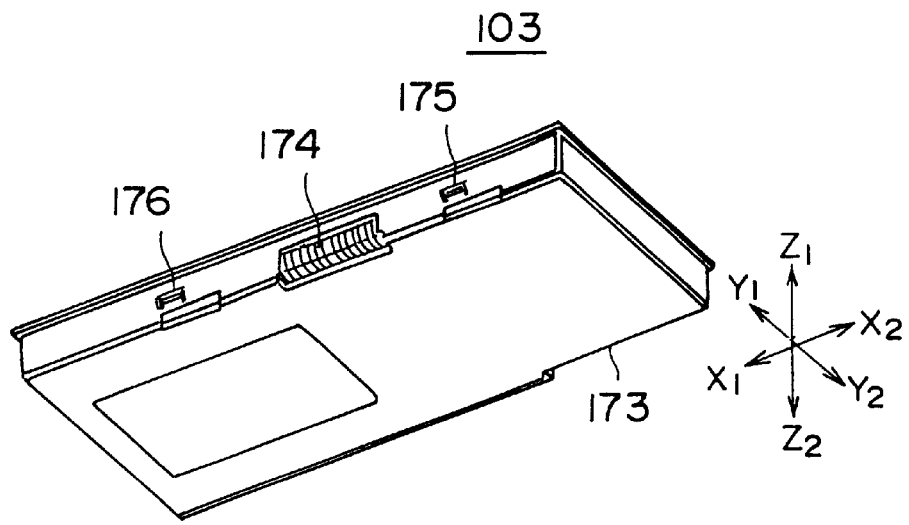
FIG. 13A and FIG. 13B are diagrams of a battery pack in the electronic equipment system.
Figure 13B:
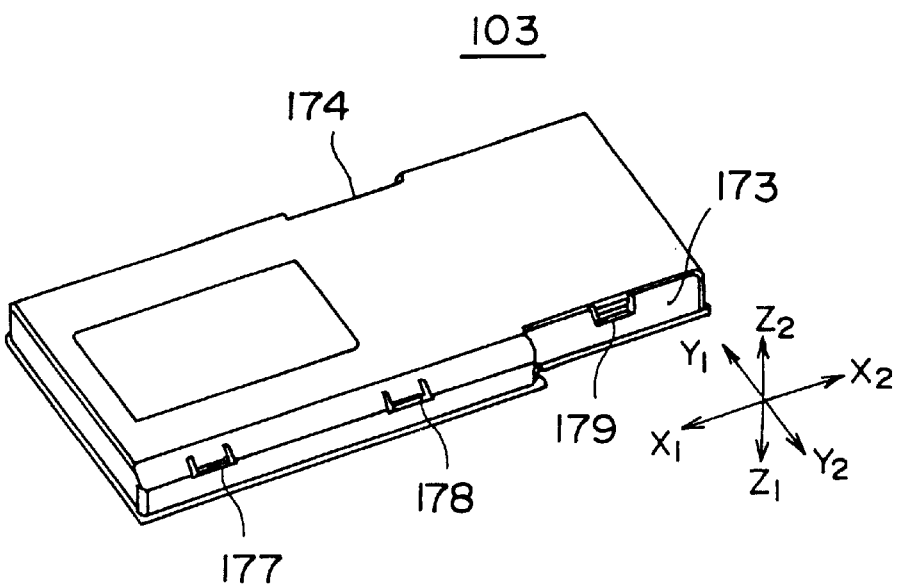

FIG. 13A and FIG. 13B show the battery pack 103 in the electronic equipment system 100. In FIG. 13A, the battery pack 103 is viewed from a lower position. In FIG. 13B, the battery pack 103 which is turned upside down is viewed from an upper position.

The battery pack 103 is provided in a generally rectangular formation. The battery pack 103 has a notch portion 173 which is provided to easily identify the front and rear faces of the battery pack 103. The battery pack 103 includes, as shown in FIG. 13A, a terminal 174 on the front face of the battery pack 103. The terminal 174 is electrically connected to one of the notebook PC 101, the expansion station 102 and the compact bay case 104, when the battery pack 103 is inserted in one of the battery pack slot 141, the battery pack slot 145 and the battery pack slot 202.

The battery pack 103 includes, as shown in FIG. 13A, a pair of recessed portions 175 and 176 on the front face of the battery pack 103. The battery pack 103 includes, as shown in FIG. 13B, a pair of recessed portions 177 and 178, and a recessed portion 179 on the rear face of the battery pack 103. The recessed portions 175 through 179 act to mechanically connect the battery pack 103 to the battery pack slot 141, 145 or 202 of the related one of the notebook PC 101, the expansion station 102 and the compact bay case 104.

Figure 14:
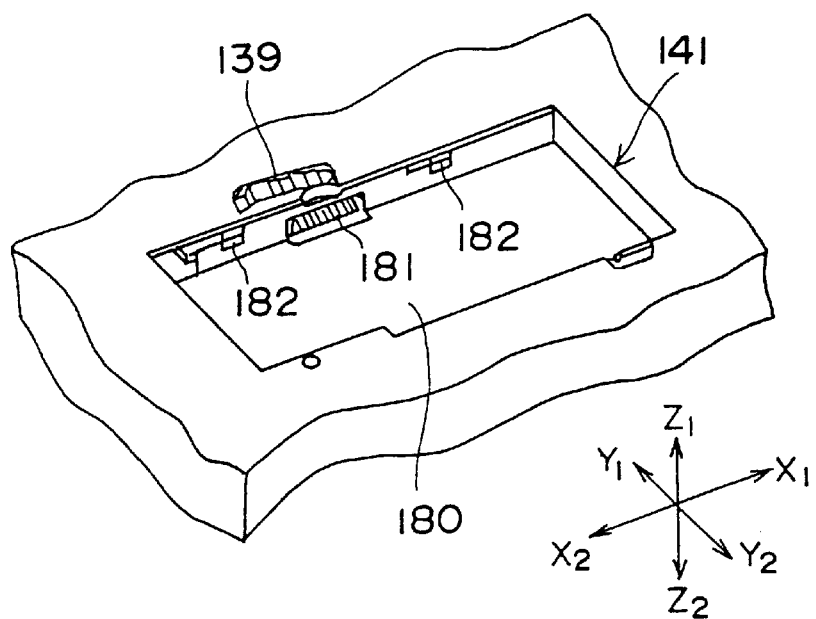
FIG. 14 is a diagram of a battery pack slot in the electronic equipment system.

FIG. 14 shows a battery pack slot in the electronic equipment system 100.

In the electronic equipment system 100 of the present embodiment, the battery pack slot 141 of the notebook PC 101, the battery pack slot 145 of the expansion station 102 and the battery pack slot 202 of the compact bay case 104 are identical in shape. The battery pack 103 can be inserted into any of the battery pack slots 141, 145 and 202. For the sake of convenience, a description will now be given of the battery pack slot 141 as a representative one of the battery pack slots 141, 145 and 202.

As shown in FIG. 14, the battery pack slot 141 includes a recess 180, a contact terminal 181, connecting portions 182 and the battery pack lock 139. The recess 180 is formed on either the top or the bottom of one of the notebook PC 101, the expansion station 102 and the compact bay case 104. The recess 180 has a configuration that is the same as the configuration of the battery pack 103. The contact terminal 181 is electrically connected to the terminal 174 of the battery pack 103 when the battery pack 103 is inserted into the recess 180. The connecting portions 182 are fitted to the recessed portions 175–179 of the battery pack 103 when the battery pack 103 is inserted into the recess 180. The battery pack lock 139 is operated by the user, and the battery pack lock 139 locks the battery pack 103 in the battery pack slot 141 by the connection of the connecting portions 182 and the recessed portions 175–179. When the battery pack lock 139 is loosened by the user, the connecting portions 182 are disconnected from the recessed portions 175–179 so that the battery pack 103 can be detached from the battery pack slot 141.

Figure 15:
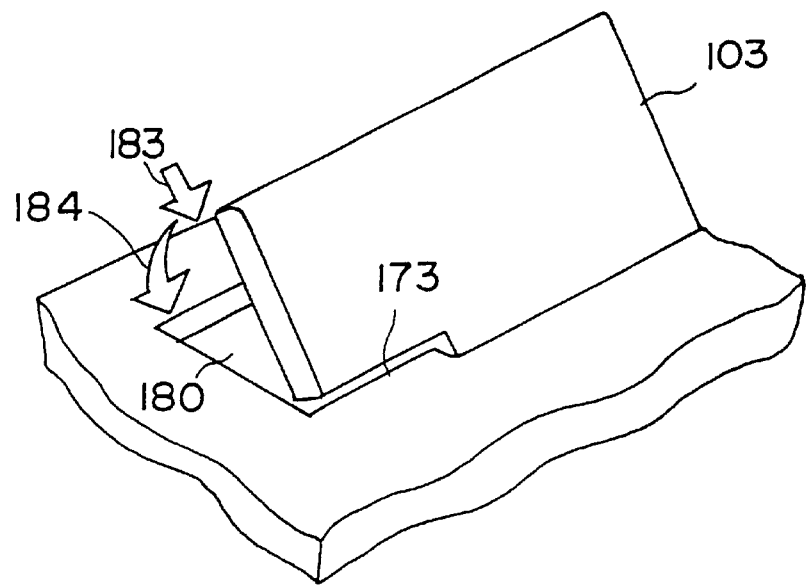
FIG. 15 is a diagram for explaining insertion of the battery pack into and withdrawal of the battery pack from the battery pack slot.

FIG. 15 is a diagram for explaining insertion of the battery pack 103 into and withdrawal of the battery pack 103 from the battery pack slot 141.

As shown in FIG. 15, when inserting the battery pack 103 into the battery pack slot 141 in a direction indicated by the arrow 183, the notch portion 173 of the battery pack 103 is matched with a corresponding portion of the recess 180 of the battery pack slot 141. While the notch portion 173 is matched with the corresponding portion of the recess 180, the battery pack 103 is rotated in a direction indicated by the arrow 184. Then, the battery pack 103 is completely inserted into the recess 180 of the battery pack slot 141.

Figure 16:
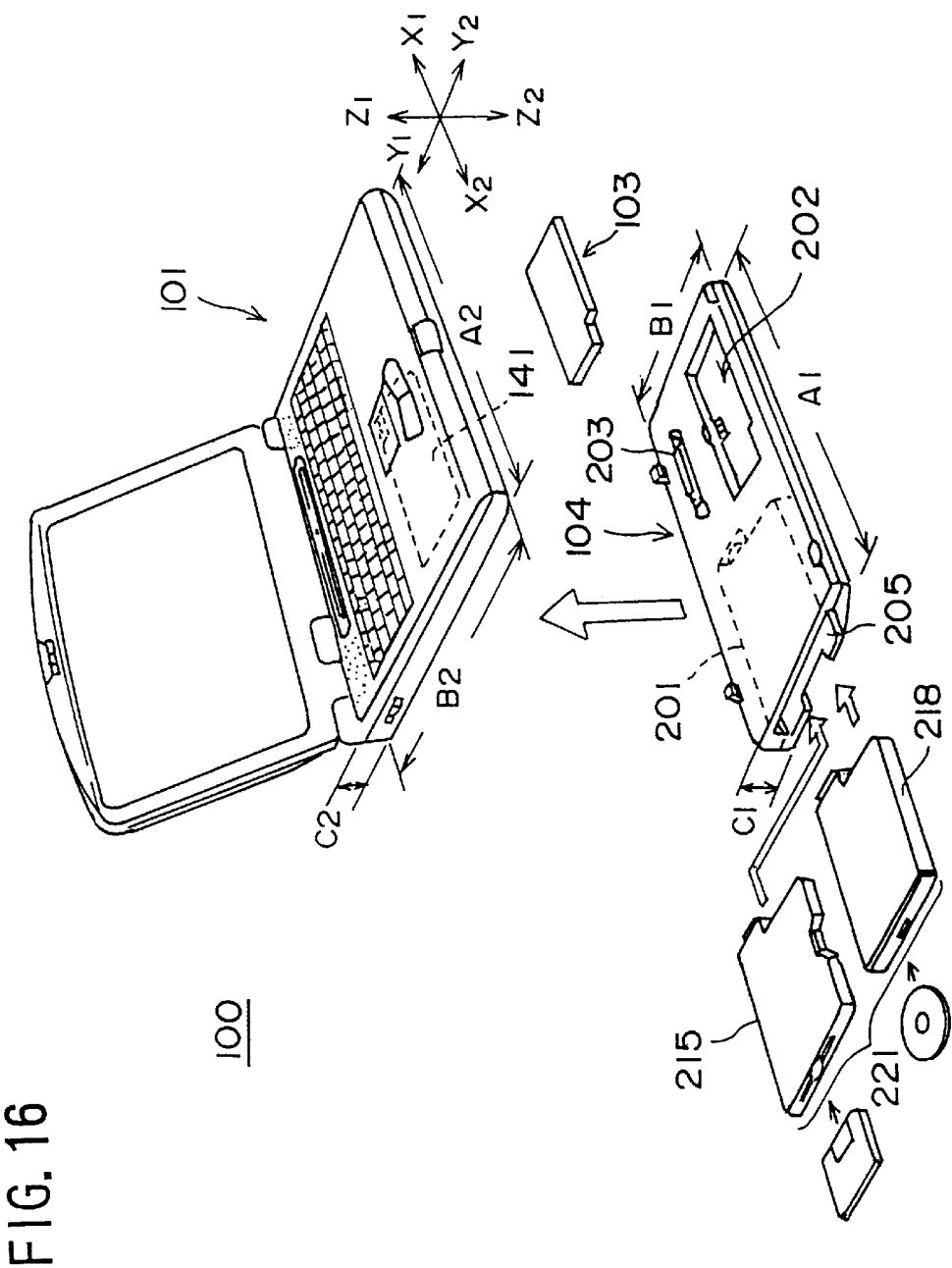
FIG. 16 is a diagram for explaining attaching of the compact bay case to and detaching of the compact bay case from the notebook PC.

FIG. 16 is a diagram for explaining attaching of the compact bay case 104 to and detaching of the compact bay case 104 from the notebook PC 101.

In the electronic equipment system 100 of the present embodiment, the compact bay case 104 is attached to the bottom of the notebook PC 101 when used. The floppy disk drive unit 215 or the CD-ROM drive unit 218 is mounted in the expansion bay 201 of the compact bay case 104 as an optional component unit 221 which provides an extended function of the notebook PC 101.

The electronic equipment system 100 of the present embodiment is characterized in that the optional component unit 221 (the floppy disk drive unit 215 or the CD-ROM drive unit 218) is detachable from the compact bay case 104 when the compact bay case 104 is attached to the notebook PC 101 which is in an operating condition.

When the compact bay case 104 containing the optional component unit 221 which is mounted in the expansion bay 201 is attached to the notebook PC 101, or when the optional component unit 221 is inserted into the vacant expansion bay 201 of the compact bay case 104 which is attached to the notebook PC 101, the compact bay case 104 transmits a connection request to the notebook PC 101 so that the notebook PC 101 recognizes the presence of the optional component unit 221 in the electronic equipment system 100.

On the other hand, when the compact bay case 104 containing the optional component unit 221 which is mounted in the expansion bay 201 is detached from the notebook PC 101, or when the optional component unit 221 is detached from the compact bay case 104 which is attached to the notebook PC 101, the user presses the undocking request button 213 on the side of the compact bay case 104. When the undocking request button 213 is pressed, the compact bay case 104 transmits an undocking request to the notebook PC 101, and the undocking request causes the notebook PC 101 to permit the detachment of the optional component unit 221 from the compact bay case 104. The compact bay case 104 receives an undocking acknowledge signal output by the notebook PC 101, and the undocking acknowledge signal indicates that the notebook PC 101 has permitted the detachment. Upon receipt of the undocking acknowledge signal, the undocking indicator LED 214 is turned on to provide an indication that the detachment of the optional component unit 221 from the compact bay case 104 is permitted. Hence, the optional component unit 221 can be detached from the compact bay case 104 when the compact bay case 104 is attached to the notebook PC 101 which is in an operating condition.

Figure 17:
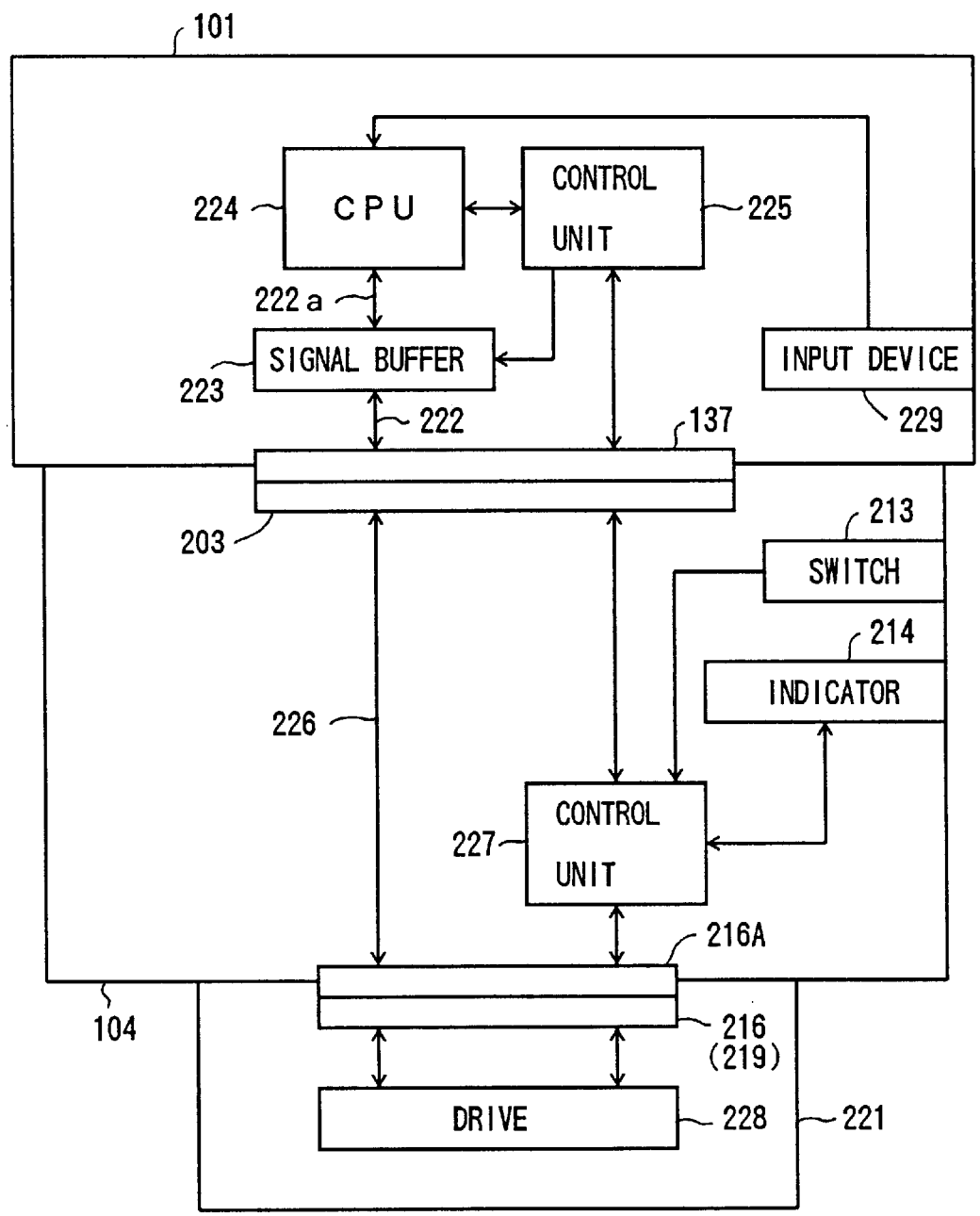
FIG. 17 is a block diagram of an essential part of the electronic equipment system.

FIG. 17 is a block diagram of an essential part of the electronic equipment system 100 which deals with the attaching of the compact bay case 104 to and the detaching of the compact bay case 104 from the notebook PC 101.

As shown in FIG. 17, the connector 137 of the notebook PC 101 and the connector 203 of the compact bay case 104 are connected to each other, and the connector 216A of the compact bay case 104 and the connector 216 (or 219) of the optional component unit 221 are connected to each other.

In the notebook PC 101, the connector 137 is connected through a PCI (peripheral component interconnect) bus 222 to a signal buffer 223, and the signal buffer 223 is connected through a PCI bus 222a to a CPU 224. A control unit 225 is connected to each of the CPU 224, the signal buffer 223 and the connector 137, and various control signals are transmitted between the control unit 225 and these elements 224, 223 and 137. Further, an input device 229 is connected to the CPU 224.

The control unit 225 executes a control process when attaching the compact bay case 104 (or the expansion station 102) to the notebook PC 101 or when detaching the compact bay case 104 (or the expansion station 102) from the notebook PC 101.

In the compact bay case 104, the connector 203 is connected through a PCI bus 226 to the connector 216A. The connector 203 is also connected to a control unit 227, and the control unit 227 is connected to the connector 216A. Further, the undocking request button (SWITCH) 213 is connected to the control unit 227, and the undocking indicator LED (INDICATOR) 214 is connected to the control unit 227.

The control unit 227 executes a control process when attaching the compact bay case 104 to the notebook PC 101 or when detaching the compact bay case 104 from the notebook PC 101.

In the optional component unit 221, the connector 216 (or 219) is connected to a drive 228. The drive 228 provides an extended function of the notebook PC 101, that is: the floppy disk drive function or the CD-ROM drive function.

Figure 18:
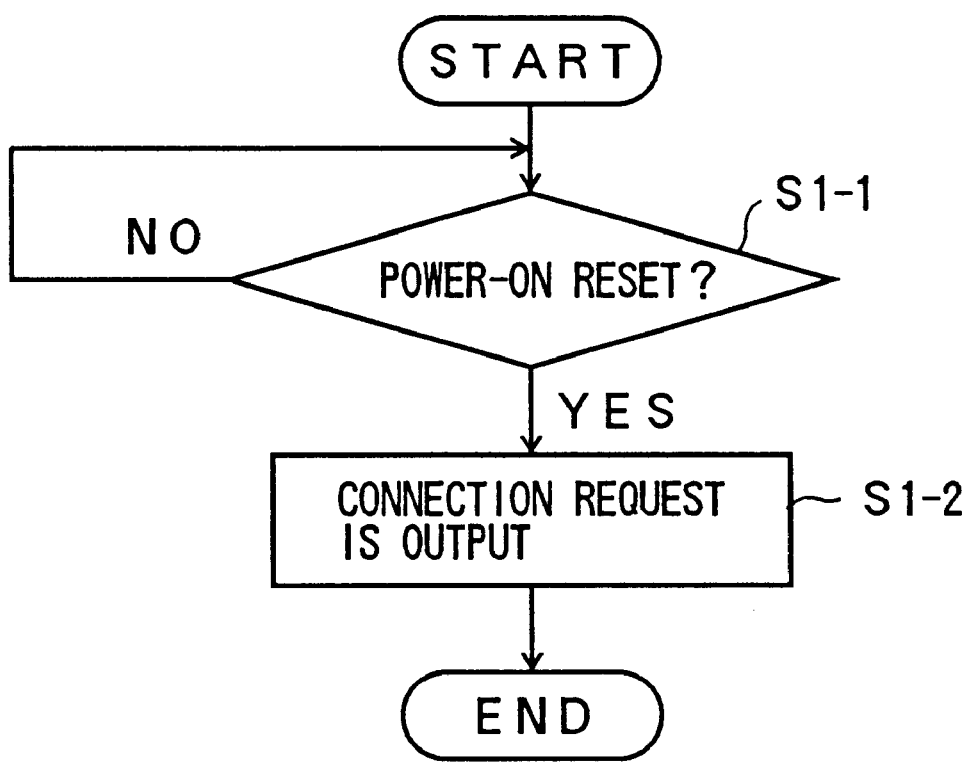
FIG. 18 is a flowchart for explaining a control process executed by a control unit of the compact bay case when the compact bay case is attached to the notebook PC during operation.

FIG. 18 shows a control process executed by the control unit 227 of the compact bay case 104 when the compact bay case 104 is attached to the notebook PC 101 during operation.

When the connector 137 of the notebook PC 101 and the connector 203 of the compact bay case 104 are connected to each other and the optional component unit 221 is mounted in the expansion bay 201 of the compact bay case 104, the control unit 227 is power-on reset by the power supplied from the notebook PC 101. As shown in FIG. 18, the control unit 227 at step S1-1 detects whether it is power-on reset. When the result at the step S1-1 is negative, the detection at step S1-1 is repeated. When the result at step S1-1 is affirmative, the control unit 227 at step S1-2 transmits a connection request to the control unit 225 of the notebook PC 101 via the connectors 203 and 137. After the connection request is output to the notebook PC 101, the control process of FIG. 18 is terminated.

Figure 19:
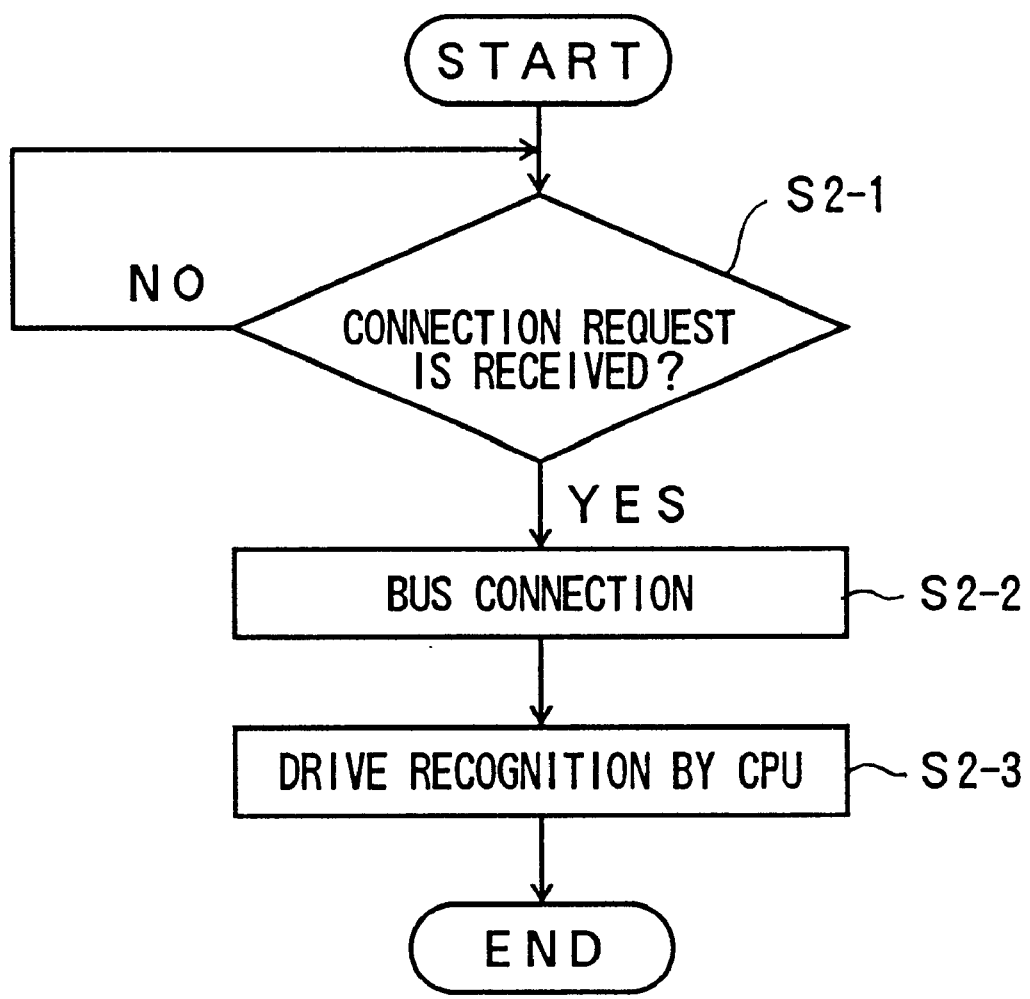
FIG. 19 is a flowchart for explaining a control process executed by a control unit of the notebook PC when the compact bay case is attached to the notebook PC during operation.

FIG. 19 shows a control process executed by the control unit 225 of the notebook PC 101 when the compact bay case 104 is attached to the notebook PC 101 during operation.

As shown in FIG. 19, the control unit 225 at step S2-1 detects whether a connection request from the control unit 227 is received at the notebook PC 101. When the result at the step S2-1 is negative, the detection at step S2-1 is repeated. When the result at step S2-1 is affirmative, the control unit 225 at step S2-2 performs a bus connection by controlling the signal buffer 223 so as to connect the PCI bus 222a and the PCI bus 226 of the compact bay case 104. After the bus connection is performed at step S2-2, the control unit 225 at step S2-3 causes the CPU 224 to recognize the presence of the drive 228 of the optional component unit 221. After the drive recognition is performed at step S2-3, the presence of the drive 228 of the optional component unit 221 attached to the notebook PC 101 via the compact bay case 104 is recognized by the CPU 224 of the notebook PC 101. Then, the control process of FIG. 19 is terminated.

Figure 20:
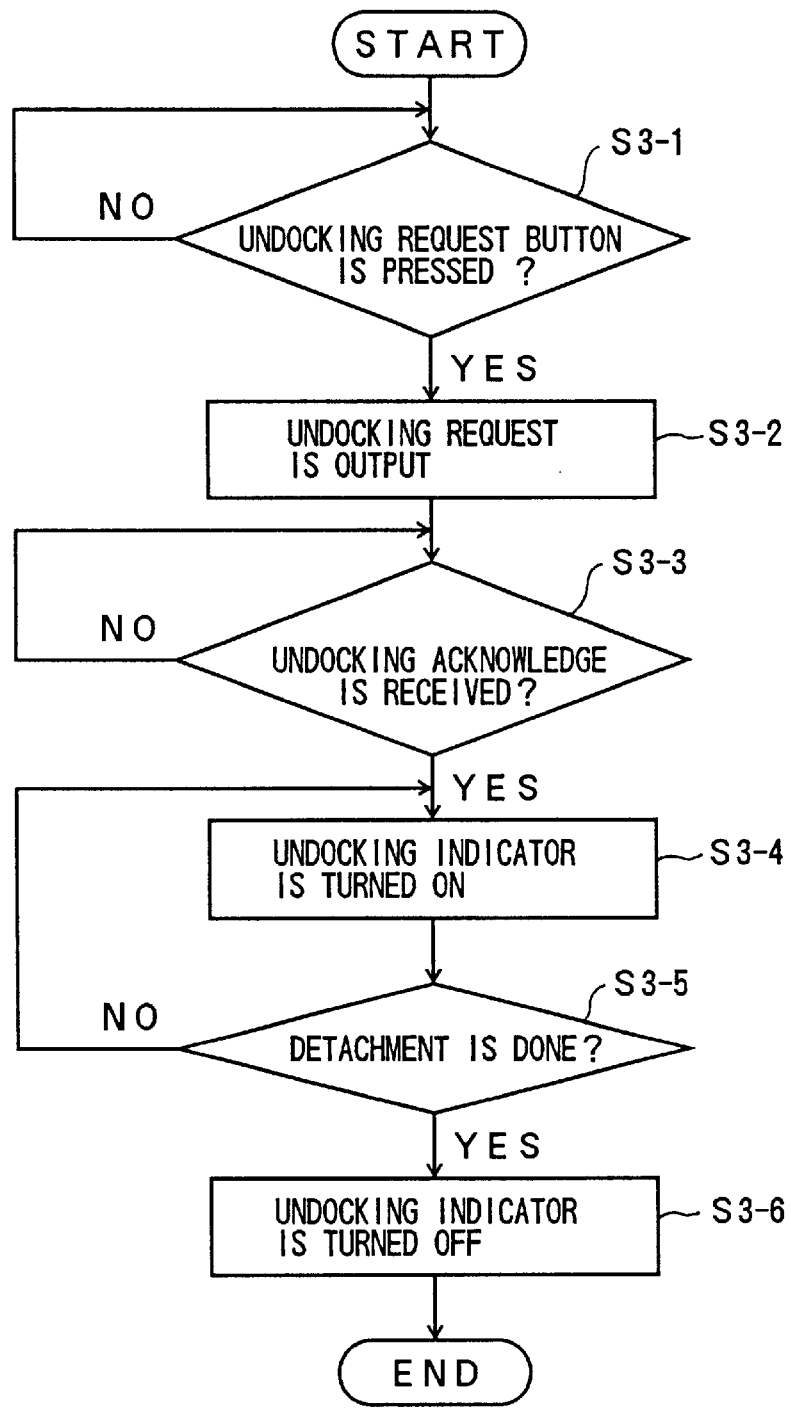
FIG. 20 is a flowchart for explaining a control process executed by the control unit of the compact bay case when the compact bay case is detached from the notebook PC during operation.

FIG. 20 shows a control process executed by the control unit 227 of the compact bay case 104 when the compact bay case 104 is detached from the notebook PC 101 during operation.

When the compact bay case 104 containing the optional component unit 221 which is mounted in the expansion bay 201 is detached from the notebook PC 101, or when the optional component unit 221 is detached from the compact bay case 104 which is attached to the notebook PC 101, the user presses the undocking request button 213 on the side of the compact bay case 104.

As shown in FIG. 20, the control unit 227 at step S3-1 detects whether the undocking request button 213 is pressed by the user. When the result at step S3-1 is affirmative, the control unit 227 at step S3-2 transmits an undocking request signal to the control unit 225 of the notebook PC 101. Otherwise the detection at step S3-1 is repeated.

After the undocking request signal is transmitted at step S3-2, the control unit 227 at step S3-3 detects whether an undocking acknowledge signal output by the control unit 225 is received at the compact bay case 104. When the result at step S3-3 is affirmative, the control unit 227 at step S3-4 turns on the undocking indicator 214. Otherwise the detection at step S3-3 is repeated. If the undocking indicator 214 is turned on, an indication that the detachment of the optional component unit 221 from the compact bay case 104 is permitted by the notebook PC 101 is provided for the user.

After the undocking indicator 214 is turned on at step S3-4, the control unit 227 at step S3-5 detects whether the compact bay case 104 is detached from the notebook PC 101, and detects whether the optional component unit 221 is detached from the compact bay case 104. The detections of the detachment at step S3-5 are performed by detecting the source power supplied from the notebook PC 101 through the compact bay case 104 to the optional component unit 221 and supplied through the optional component unit 221 to the control unit 227. When the compact bay case 104 is detached from the notebook PC 101, the source power from the notebook PC 101 is not supplied to the control unit 227. When the optional component unit 221 is detached from the compact bay case 104, the source power from the notebook PC 101 is not supplied to the control unit 227. Hence, by detecting the non-supplying of the source power to the control unit 227, the detections of the detachment at step S3-5 can be performed by the control unit 227.

When it is detected at step S3-5 that the compact bay case 104 is detached from the notebook PC 101 or that the optional component unit 221 is detached from the compact bay case 104, the control unit 227 at step S3-6 turns off the undocking indicator 214. Otherwise the steps S3-4 and S3-5 are repeated. After the step S3-6 is performed, the control process of FIG. 20 is terminated.

Figure 21:
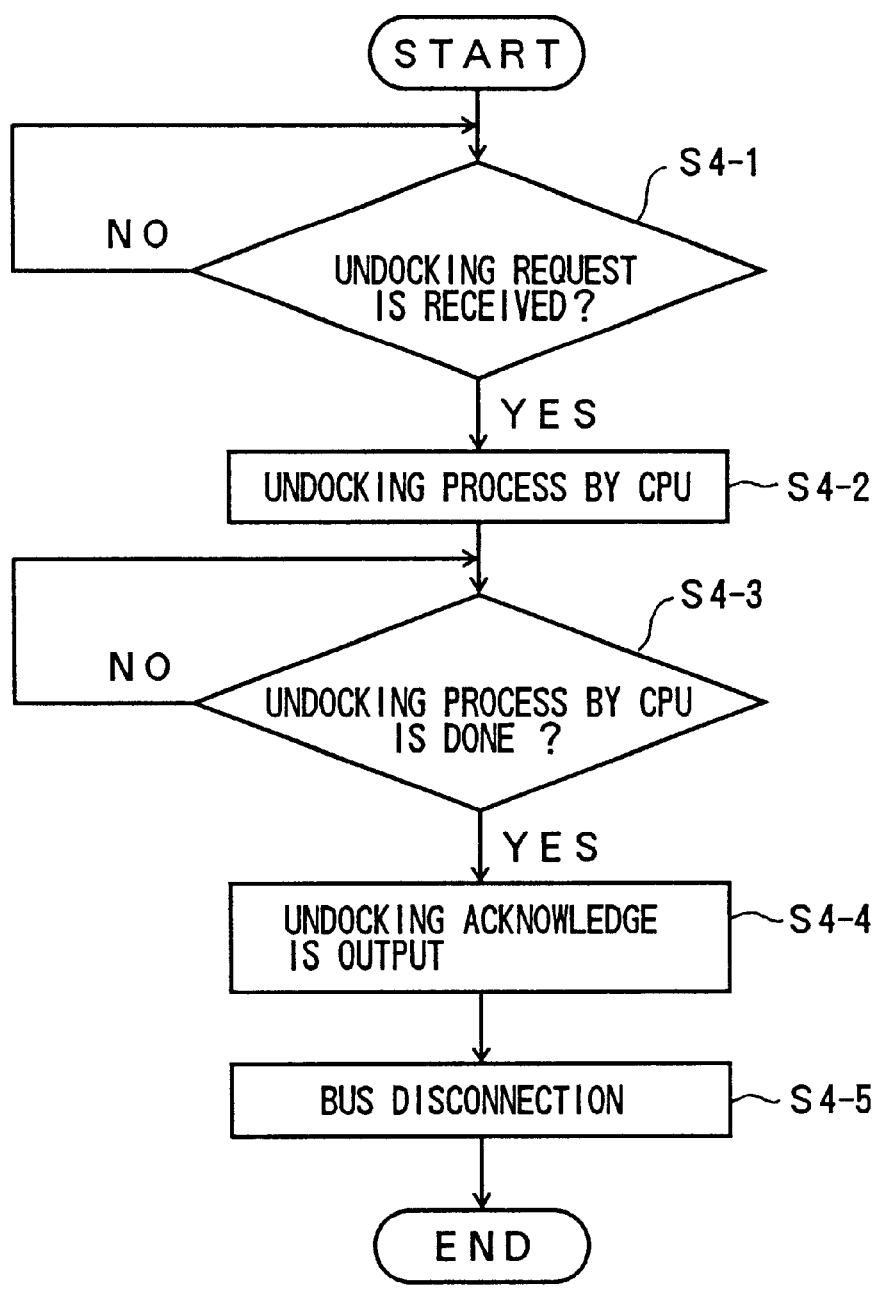
FIG. 21 is a flowchart for explaining a control process executed by the control unit of the notebook PC when the compact bay case is detached from the notebook PC during operation.

FIG. 21 shows a control process executed by the control unit 225 of the notebook PC 101 when the compact bay case 104 is detached from the notebook PC 101 during operation.

As shown in FIG. 21, the control unit 225 at step S4-1 detects whether an undocking request signal output by the control unit 227 is received. When the result at step S4-1 is affirmative, the control unit 225 at step S4-2 causes the CPU 224 to perform an undocking process. Otherwise the detection at step S4-1 is repeated. During the undocking process by the CPU 224, the recognition of the drive 228 of the optional component unit 221 is canceled.

After the step S4-2 is performed, the control unit 225 at step S4-3 detects whether the undocking process by the CPU 224 is complete. When the result at step S4-3 is affirmative, the control unit 225 at step S4-4 transmits an undocking acknowledge signal to the control unit 227 of the compact bay case 104. Otherwise the detection at step S4-3 is repeated. The undocking acknowledge signal, transmitted to the control unit 227, indicates that the notebook PC 101 has permitted the detachment of the compact bay case 104 from the notebook PC 101 or the detachment of the optional component unit 221 from the compact bay case 104.

After the undocking acknowledge signal is transmitted to the control unit 227 at step S4-4, the control unit 225 at step S4-5 performs a bus disconnection by controlling the signal buffer 223 so as to disconnect the PCI bus 222a from the PCI bus 226 of the compact bay case 104. After the step S4-5 is performed, the control process of FIG. 21 is terminated.

In the above-described embodiment, the optional component unit 221 is detachable from the compact bay case 104 when the compact bay case 104 is connected to the notebook PC 101 which is in an operating condition. When the optional component unit 221 in the compact bay case 104 is exchanged for a new component unit, it is not necessary to stop operation of the notebook PC 101 or turn off the power switch 118 of the notebook PC 101. It is possible to exchange the optional component unit 221 for the new component unit even when the notebook PC 101 is operating. The electronic equipment system 100 of the above-described embodiment is effective in providing an adequate level of operability for the user.

Figure 22:
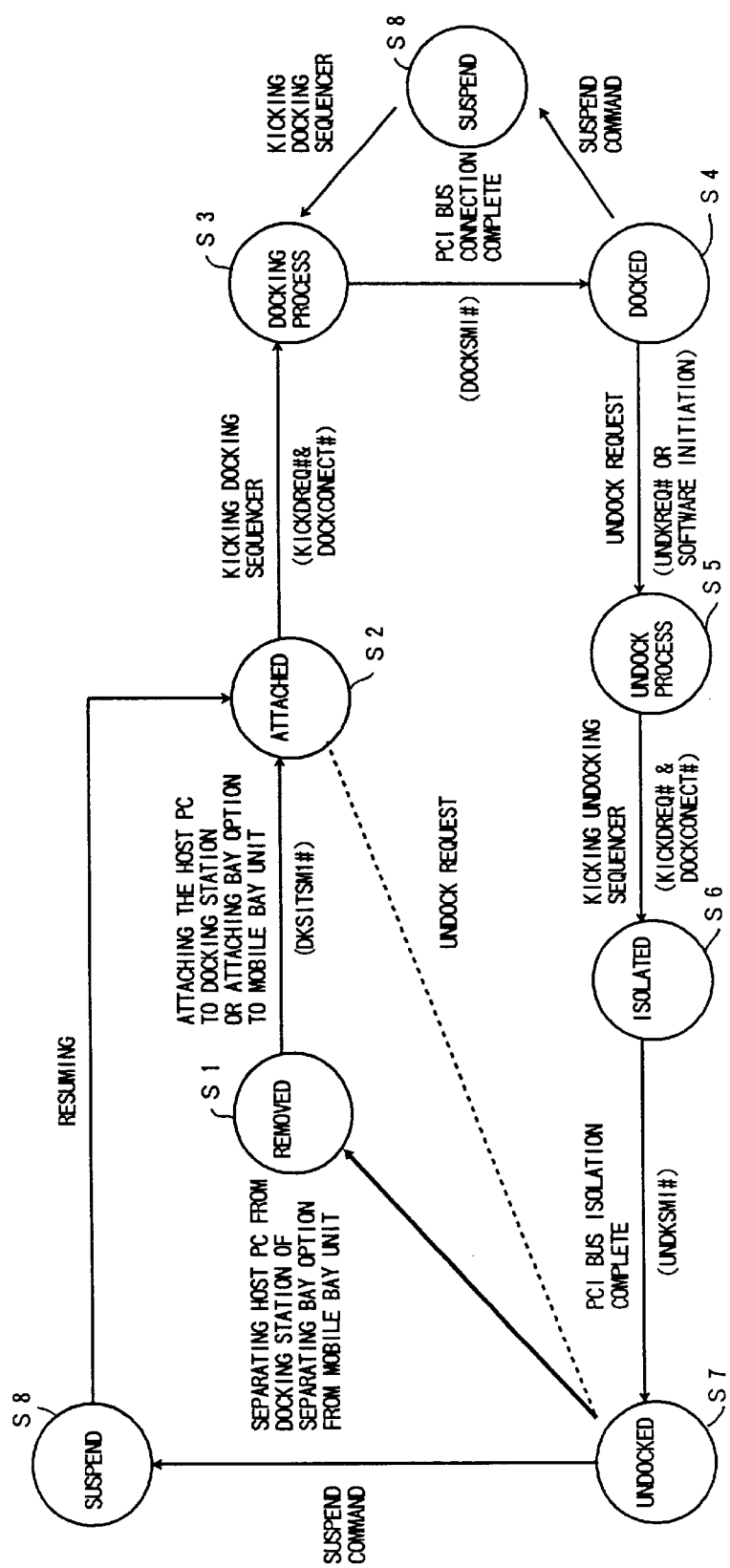
FIG. 22 is a diagram for explaining a transition of docking conditions of the electronic equipment system.

FIG. 22 shows a transition of docking conditions of the electronic equipment system 100.

The electronic equipment system 100 of the present embodiment during operation is controlled to have a transition of docking conditions shown in FIG. 22. The docking conditions of FIG. 22 include a removed state S1, an attached state S2, a docking process state S3, a docked state S4, an undocking process state S5, an isolated state S6, an undocked state S7, and a suspended state S8. The electronic equipment system 100 during operation is controlled to be in one of these states S1–S8.

When the electronic equipment system 100 is in the removed state S1, the expansion station 102 is detached from the notebook PC 101, the compact bay case 104 is detached from the notebook PC 101, or the optional component unit 221 is detached from the compact bay case 104 while the compact bay case 104 is attached to the notebook PC 101.

The attached state S2 is a transient state of the electronic equipment system 100. In the attached state S2, the notebook PC 101 is connected to the expansion station 102 but the PCI bus connection between the notebook PC 101 and the expansion station 102 is not yet started, or the optional component unit 221 is connected to the compact bay case 104 which is attached to the notebook PC 101 but the PCI bus connection between the notebook PC 101 and the compact bay case 104 is not yet started.

When the electronic equipment system 100 is in the docking process state S3, the PCI bus connection between the notebook PC 101 and the expansion station 102 is being performed, or the PCI bus connection between the notebook PC 101 and the compact bay case 104 is being performed. After the PCI bus connection is complete, the electronic equipment system 100 changes from the docking process state S3 to the docked state S4. The timing of completion of the PCI bus connection is notified to the software of the notebook PC 101 by an event DOCKSMI# issued by the control unit 225 of the notebook PC 101. The event DOCKSMI# is issued to notify the software of the completion of the PCI bus connection.

The docked state S4 is a state of the electronic equipment system 100 in which the docking of the expansion station 102 and the notebook PC 101 is complete, or the docking of the optional component unit 221 and the compact bay case 104 attached to the notebook PC 101 is complete. The completion of the docking means that both the PCI bus connection and the docking notification to the software of the notebook PC 101 are carried out. When the electronic equipment system 100 changes to the docked state S4, the configuration of the resources of the electronic equipment system 100 is restarted. As a result of the configuration, the devices newly docked to the electronic equipment system 100 are recognized by the CPU 224 of the notebook PC 101 so that the devices are available.

The electronic equipment system 100 changes from the docked state S4 to the undocking process state S5 at a start of an undocking process when the undocking request button on the compact bay case 104 or the expansion station 102 is pressed by the user or when an undocking request icon on the display monitor of the notebook PC 101 is clicked by the user. The undocking process is started by an event UNDKREQ# issued by the software of the notebook PC 101. During the undocking process, interrupt requests are sent to device drivers recognized by the operating system kernel, and the PCI bus isolation request for the undocking is issued by the BIOS (basic input output system) and the device drivers after the interrupt requests are accepted. After the undocking process is complete, the electronic equipment system 100 changes from the undocking process state S5 to the isolated state S6.

When the electronic equipment system 100 is in the isolated state S6, the PCI bus isolation between the notebook PC 101 and the expansion station 102 is being performed, or the PCI bus isolation between the notebook PC 101 and the compact bay case 104 is being performed. After the PCI bus isolation is complete, an event UNDKSMI# is issued to notify the software of the notebook PC 101 that the undocking is performed. After the notification of the undocking is performed, the electronic equipment system 100 changes from the isolated state S6 to the undocked state S7.

When the electronic equipment system 100 is in the undocked state S7, the PCI bus isolation between the notebook PC 101 and the expansion station 102 is complete but the expansion station is connected to the notebook PC 101, or the PCI bus isolation between the optional component unit 221 and the compact bay case 104 attached to the notebook PC 101 is complete but the optional component unit 221 is connected to the compact bay case 104. During the undocked state S7, all the resources of the expansion station 102 or all the resources of the compact bay case 104 are not recognized by the notebook PC 101. When the electronic equipment system 100 is in the undocked state S7, the undocking indicator LED is turned on.

The electronic equipment system 100 changes from the undocked state S7 to the removed state S1 when the expansion station 102 is detached from the notebook PC 101 or when the compact bay case 104 is detached from the notebook PC 101. When the electronic equipment system 100 is in the undocked state S7 and a suspend command is issued, the electronic equipment system 100 changes to the suspended state S8.

When the electronic equipment system 100 is in the suspended state S8, the source power is not supplied to most of the resources of the expansion station 102 connected to the notebook PC 101, or the source power is not supplied to most of the resources of the compact bay case 104 connected to the notebook PC 101. During the suspended state S8, the source power is supplied to only the portion of the expansion station 102 or the compact bay case 104, needed to monitor the docking conditions of the electronic equipment system 100.

When the electronic equipment system 100 changes from the docked state S4 to the suspended state S8, the PCI bus between the notebook PC 101 and the expansion station 102 or the PCI bus between the optional component unit 221 and the compact bay case 104 is automatically isolated. In order to allow the electronic equipment system 100 to change from the suspended state S8 to the docked state S4, it is necessary to perform the PCI bus connection between the notebook PC 101 and the expansion station 102 or the PCI bus connection between the optional component unit 221 and the compact bay case 104. Hence, the electronic equipment system 100 must change from the suspended state S8 to the docked state S4 through the docking process state S3.

When the electronic equipment system 100 is in the undocked state S7 and a suspend command is issued, the electronic equipment system 100 changes to the suspended state S8. Further, when the electronic equipment system 100 is in the suspended state S8 and a resuming operation is performed, the electronic equipment system 100 changes to the attached state S2. At this time, an event DKSITSMI# is issued to notify the software of the notebook PC 101 that the docking is performed.

The electronic equipment system 100 of the present embodiment during operation changes from one of the docking conditions to another due to occurrence of any of the events (or the interrupt requests) DKSITSMI#, UNDKREQ#, DOCKSMI# and UNDKSMI#.

The event DKSITSMI# is issued to notify the software of the notebook PC 101 that the docking is performed. For example, when the expansion station 102 is attached to the notebook PC 101, or when the optional component unit 221 is attached to the compact bay case 104 connected to the notebook PC 101, the attachment of the expansion station 102 or the attachment of the optional component unit 221 is notified to the software of the notebook PC 101. The transition of the docking conditions of the electronic equipment system 100 as described above is caused by the event DKSITSMI#.

The event UNDKREQ# is issued to notify the software of the notebook PC 101 that the undocking request button is pressed. The transition of the docking conditions of the electronic equipment system 100 as described above is caused by the event UNDKREQ#.

The event DOCKSMI# is issued to notify the software of the notebook PC 101 that the PCI bus between the expansion station 102 and the notebook PC 101 or the PCI bus between the optional component unit 221 of the compact bay case 104 and the notebook PC 101 is connected to each other. The transition of the docking conditions of the electronic equipment system 100 as described above is caused by the event DOCKSMI#.

The event UNDKSMI# is issued to notify the software of the notebook PC 101 that the PCI bus between the expansion station 102 and the notebook PC 101 or the PCI bus between the optional component unit 221 of the compact bay case 104 and the notebook PC 101 is disconnected from to each other. The transition of the docking conditions of the electronic equipment system 100 as described above is caused by the event UNDKSMI#.

The interrupt request signals of the events DKSITSMI#, UNDKREQ#, DOCKSMI# and UNDKSMI# when each of the events is issued are respectively transmitted to a connection controller 302 (which will be described later) of the notebook PC 101.

Figure 23:
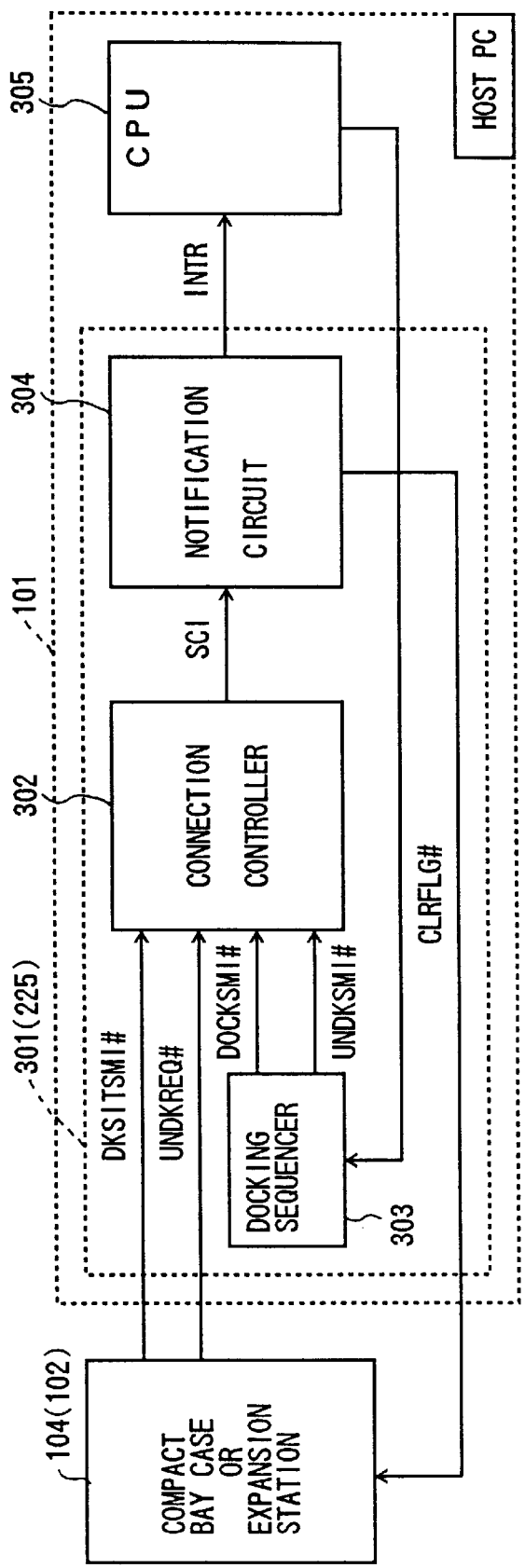
FIG. 23 is a block diagram of the control unit of the notebook PC in the electronic equipment system.

FIG. 23 shows a configuration of the control unit 225 of the notebook PC 101 in the electronic equipment system 100 of the present embodiment.

As shown in FIG. 23, the control unit 225 of the notebook PC 101 generally has a connection controller 302, a docking sequencer 303, and a notification circuit 304. The control unit 225 of the notebook PC 101 in FIG. 17 is referred to as the connection circuit 301 in FIG. 23. The CPU 224 of the notebook PC 101 in FIG. 17 is referred to as the CPU 305 in FIG. 23.

In the connection circuit 301 of FIG. 23, the polling of the events DKSITSMI#, UNDKREQ#, DOCKSMI# and UNDKSMI# is performed by the connection controller 302 at time intervals of 10 ms. Event time the interrupt request signal of one of the events DKSITSMI#, UNDKREQ#, DOCKSMI# and UNDKSMI# is detected, the connection controller 302 causes the notification circuit 304 to output an interrupt signal to the software of the notebook PC 101 processed by the CPU 305.

The docking sequencer 303 is initiated in accordance with an instruction output by the CPU 305, and outputs the interrupt request signal of one of the events DOCKSMI# and UNDKSMI# to the connection controller 302. Hence, the transition of the docking conditions of the electronic equipment system 100 as described above is caused by the docking notification event DOCKSMI# or the undocking notification event UNDKSMI#.

In response to the request output by the connection controller 302, the notification circuit 304 supplies an interrupt signal to the software of the notebook PC 101 which is processed by the CPU 305. In order to detect the cause of the interrupt supplied, the software issues a query command to the connection controller 302, and receives a return value of the query command from the connection controller 302. When a return value which corresponds to one of the events DKSITSMI#, UNDKREQ#, DOCKSMI# and UNDKSMI# is detected, the cause of the interrupt supplied by the notification circuit 304 can be recognized by the software of the notebook PC 101.

After the processing of the event is complete, the notification circuit 304 supplies a status clear signal CLRFLG# to the expansion station 102 or the control unit 227 of the compact bay case 104. The status clear signal is supplied to clear the event status of the expansion station 102 or the compact bay case 104. The control unit 227 of the compact bay case 104 cancels the latch of the events DKSITSMI# and UNDKREQ#, and is allowed to accept a subsequent interrupt.

When the expansion station 102 is attached to the notebook PC 101, internal signals CD1# and CD2# which confirm the connection of the expansion station 102 and the notebook PC 101 are asserted, and the interrupt request signal DKSITSMI#, output to the connection controller 302, is set in the low state after the internal signals CD1# and CD2# become stable. The output of the interrupt request signal DKSITSMI# is performed when the notebook PC 101 is in the off state, the sleep state or the on state. When the power switch of the notebook PC 101 is turned on, the low state of the interrupt request signal DKSITSMI# output by the expansion station 102 is detected. The connection controller 302 is able to accept the low-state interrupt request signal DKSITSMI# output by the expansion station 102.

When the optional component unit 221 is attached to the compact bay case 104 connected to the notebook PC 101, internal signals CD1# and CD2# which confirm the connection of the compact bay case 104 and the notebook PC 101 are asserted, internal signals BAYCD#1 and BAYCD#2 which confirm the connection of the optional component unit 221 and the expansion bay 201 are asserted, and the interrupt request signal DKSITSMI#, output to the connection controller 302, is set in the low state after the internal signals CD1#, CD2#, BAYCD#1 and BAYCD#2 become stable.

The interrupt request signal DKSITSMI# is normally set in the high state. When the notebook PC 101 is in the off state or the sleep state, the latch-up of the interrupt request signal DKSITSMI# output to the connection controller 302 may arise. The blocking of the interrupt request signal DKSITSMI# from the notebook PC 101 by utilizing a diode is performed to avoid the latch-up. A pulling-up processing measure on the side of the notebook PC 101 is taken by utilizing a power supply which is equivalent to the power supply of an interrupt detection unit.

After the interrupt signal is detected by the software of the notebook PC 101 and the processing of the event is complete, the notification circuit 304 of the notebook PC 101 supplies a status clear signal CLRFLG# to the control unit 227 of the compact bay case 104. The status clear signal is supplied to clear the event status of the compact bay case 104. The control unit 227 of the compact bay case 104 cancels the latch of the event DKSITSMI#, and is allowed to accept a subsequent interrupt.

Figure 24:
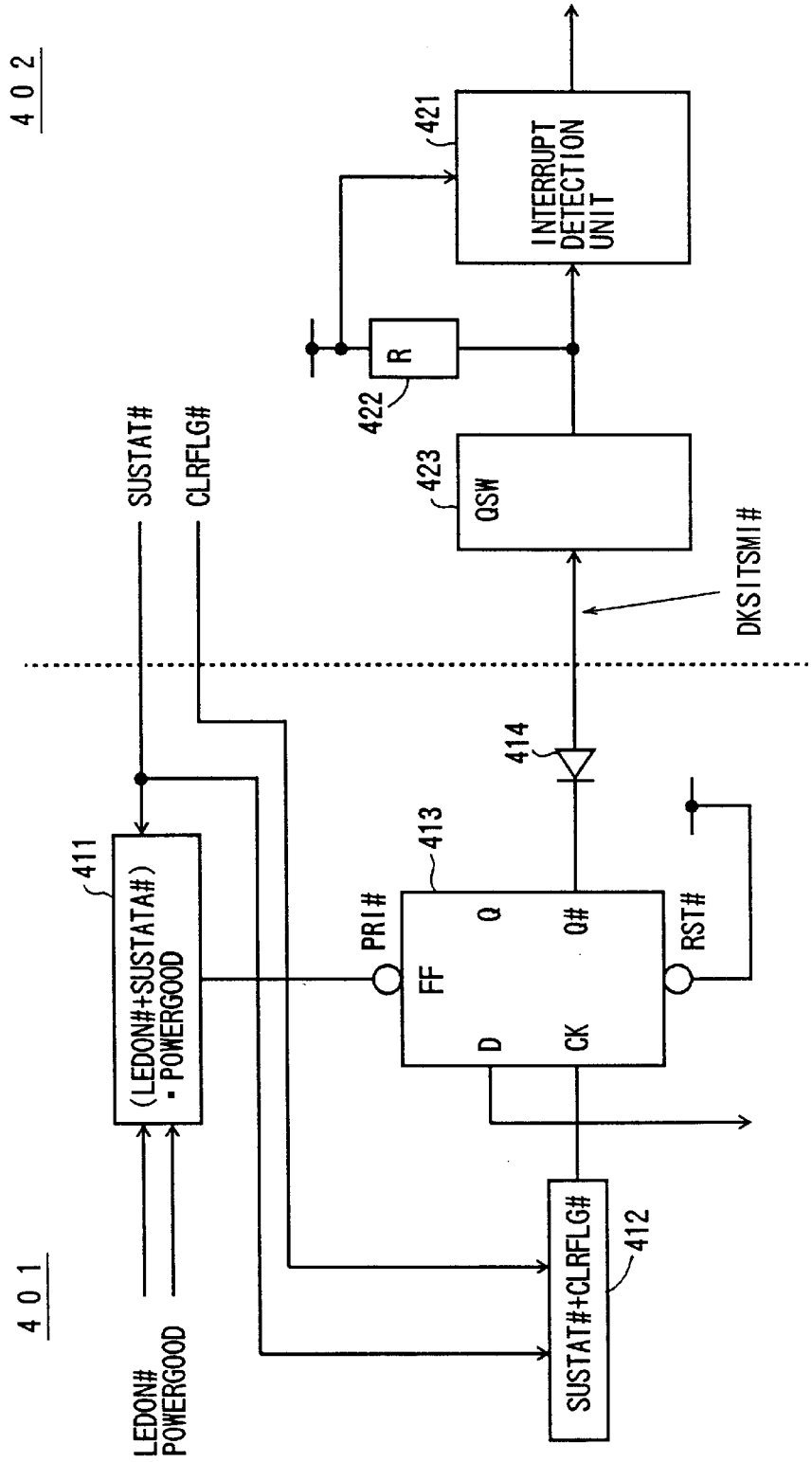
FIG. 24 is a block diagram of a docking request generating unit in the electronic equipment system.

FIG. 24 shows a docking request generating unit 400 in the electronic equipment system 100. The docking request generating unit 400 on the side of the compact bay case 104 outputs a docking request (or the interrupt request signal DKSITSMI#) to the notebook PC 101 to permit attachment of the optional component unit 221 to the compact bay case 104 or attachment of the expansion station 102 to the notebook PC 101.

The docking request generating unit 400 in the present embodiment is constituted by both a first control circuit 401 which is provided in the control unit 227 of the compact bay case 104 and a second control circuit 402 which is provided in the control unit 225 of the notebook PC 101.

The first control circuit 401 includes, as shown in FIG. 24, a first logic circuit 411, a second logic circuit 412, a flip-flop 413 and a diode 414. A signal LEDON# which is set in the low state when the undocking indicator LED is turned on, and a power-supply signal POWERGOOD which is set in the high state when the source power is properly supplied to the compact bay case 104 are supplied from internal circuits of the compact bay case 104 to the first logic circuit 411. A signal SUSTAT# is supplied from the notebook PC 101 to the first logic circuit 411. The first logic circuit 411 performs a logic operation of (the signal LEDON#+the signal POWERGOOD)·the signal SUSTAT#, and outputs a preset signal PRI# to an input FF of the flip-flop 413 as a result of the logic operation.

The signal SUSTAT# and the status clear signal CLRFLG# are supplied from the notebook PC 101 to the second logic circuit 412. The second logic circuit 412 performs a logic operation of (the signal SUSTAT#+the signal CLRFLG#), and outputs a clock signal to a clock input CK of the flip-flop 413 as a result of the logic operation. A data input D of the flip-flop 413 is always retained in the high state.

The docking request (or the interrupt request signal DKSITSMI#) is output from an inversion output Q# of the flip-flop 413 to the second control circuit 402 of the notebook PC 101. As shown in FIG. 24, the interrupt request signal DKSITSMI# is supplied through the diode 414 to the second control circuit 402 of the notebook PC 101. The diode 414 acts to perform the blocking of the interrupt request signal DKSITSMI# from the notebook PC 101 when the notebook PC 101 is set in the off state or the sleep state. The latch-up of the flip-flop 413 is avoided by the diode 414.

The second control circuit 402 includes, as shown in FIG. 24, an interrupt detection unit 421, a resistor 422, and a switch 423. The interrupt detection unit 421 detects the presence of the docking request (or the interrupt request signal DKSITSMI#) supplied by the first control circuit 401 when the supplied interrupt request signal DKSITSMI# is set in the low state. The resistor 422 is connected between the power supply of the interrupt detection unit 412 and the signal path of the interrupt request signal DKSITSMI#. The resistor 422 acts to pull up the signal path of the interrupt request signal DKSITSMI#. The diode 414 and the resistor 422 prevent the latch-up of the flip-flop 413 when the notebook PC 101 is set in the off state or the sleep state. The switch 423 is turned on or off in accordance with the PCI bus connection or the PCI bus isolation, and controls the supply of the docking request (or the interrupt request signal DKSITSMI#) to the interrupt detection unit 421 on the signal path.

In the docking request generating unit 400 of FIG. 24, when the expansion station 102 is attached to the notebook PC 101, the internal signals CD1# and CD2# which confirm the connection of the expansion station 102 and the notebook PC 101 are asserted, and the interrupt request signal DKSITSMI#, output to the control unit 225 of the notebook PC 101, is set in the low state after the internal signals CD1# and CD2# become stable. The first control circuit 401 outputs the interrupt request signal DKSITSMI# when the notebook PC 101 is in the off state, the sleep state or the on state. When the power switch of the notebook PC 101 is turned on, the low state of the interrupt request signal DKSITSMI# output by the expansion station 102 is detected by the interrupt detection unit 421. The connection controller 302 is able to accept the low-state interrupt request signal DKSITSMI# output by the expansion station 102.

When the optional component unit 221 is attached to the compact bay case 104 connected to the notebook PC 101, the internal signals CD1# and CD2# which confirm the connection of the compact bay case 104 and the notebook PC 101 are asserted, the internal signals BAYCD#1 and BAYCD#2 which confirm the connection of the optional component unit 221 and the expansion bay 201 are asserted, and the interrupt request signal DKSITSMI#, output to the control unit 225 of the notebook PC 101, is set in the low state after the internal signals CD1#, CD2#, BAYCD#1 and BAYCD#2 become stable. The first control circuit 401 outputs the interrupt request signal DKSITSMI# to the interrupt detection unit 421 when the notebook PC 101 is in the off state, the sleep state or the on state.

Next, a description will be given of an undocking process of the electronic equipment system 100 when the undocking request button on the compact bay case 104 or the expansion station 102 is pressed by the user or when the undocking request icon on the display monitor of the notebook PC 101 is clicked by the user.

In the electronic equipment system 100 of the present embodiment, when the undocking request button on the compact bay case 104 or the expansion station 102 is pressed by the user or when the undocking request icon on the display monitor of the notebook PC 101 is clicked by the user, the interrupt request signal UNDKREQ# is issued by the software of the notebook PC 101. The undocking process is started by the interrupt request signal UNDKREQ# issued by the software of the notebook PC 101. After the undocking process is complete, the electronic equipment system 100 changes from the undocking process state S5 to the isolated state S6.

The interrupt request signal UNDKREQ# is asserted low when the compact bay case 104 or the expansion station 102 is attached to the notebook PC 101 and the notebook PC 101 is set in the on state. However, when the undocking indicator LED 214 is turned on after the undocking process is complete, the pressing of the undocking request button or the clicking of the undocking request icon is disregarded.

Figure 25:
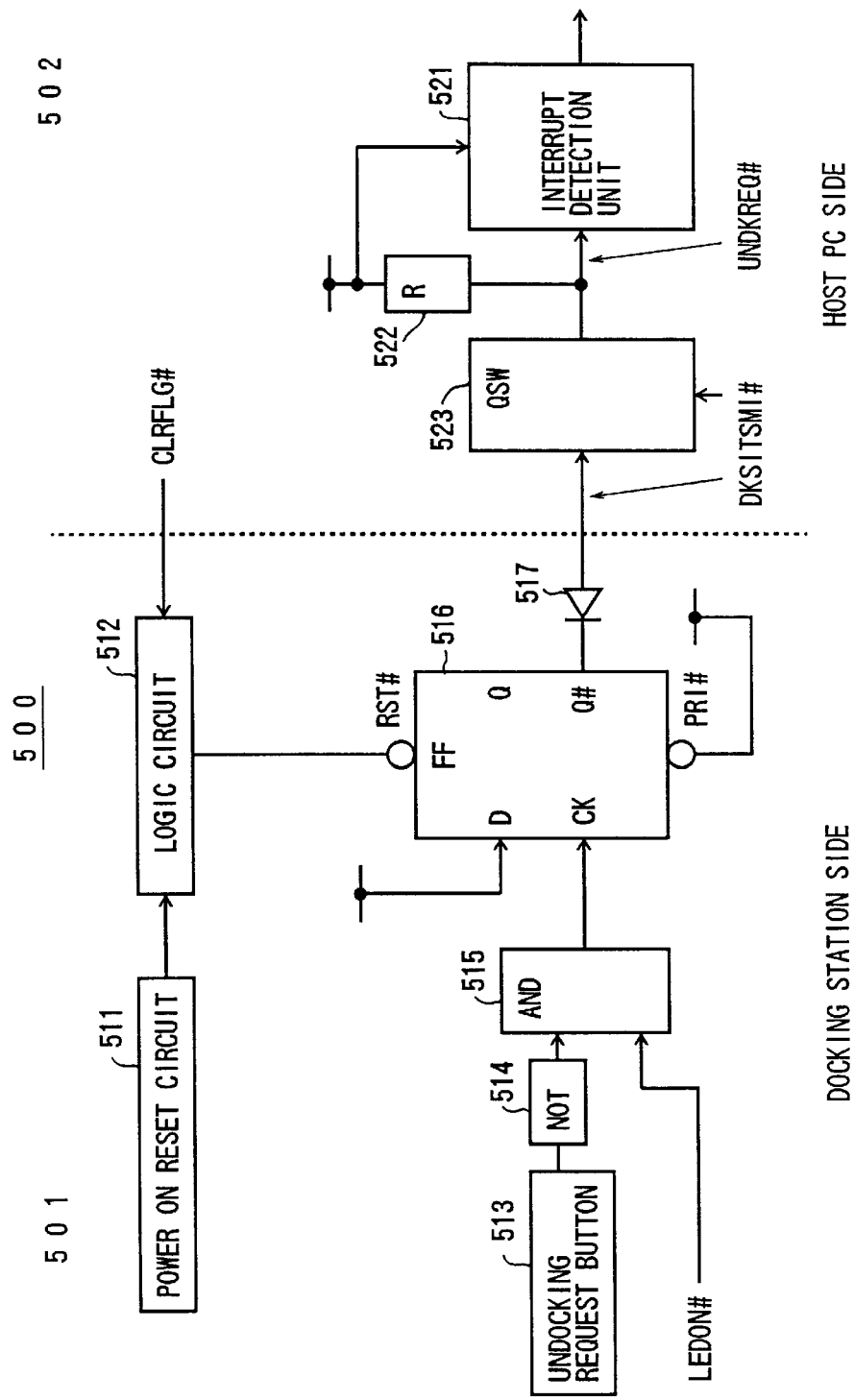
FIG. 25 is a block diagram of an undocking request generating unit in the electronic equipment system.

FIG. 25 shows an undocking request generating unit 500 in the electronic equipment system 100. The undocking request generating unit 500 on the side of the compact bay case 104 or the expansion station 102 (or on the side of the docking station) outputs an undocking request (the interrupt request signal UNDKREQ#) to the notebook PC 101 to permit detachment of the optional component unit 221 from the compact bay case 104 or detachment of the expansion station 102 from the notebook PC 101.

The undocking request generating unit 500 in the present embodiment is constituted by both a first control circuit 501 which is provided in the control unit 227 of the compact bay case 104 and a second control circuit 502 which is provided in the control unit 225 of the notebook PC 101.

The first control circuit 501 includes, as shown in FIG. 25, a power-on reset circuit 511, a logic circuit 512, an undocking request button 513, a NOT gate 514, an AND gate 515, a flip-flop 516 and a diode 517.

The power-on reset circuit 511 is provided in a power supply circuit of the compact bay case 104 (or the expansion station 102). When the source power from the battery pack 103 or the AC adapter is supplied to the compact bay case 104 (or the expansion station 102), the power-on reset circuit 511 is set in the on state. A power-on reset signal output by the power-on reset circuit 511 is supplied to the logic circuit 512, and the status clear signal CLRFLG# output by the notebook PC 101 is supplied to the logic circuit 512. The logic circuit 512 performs an AND operation of the power-on reset signal and the status clear signal CLRFLG#, and outputs a reset signal RST# to an input FF of the flip-flop 516 as a result of the logic operation.

The undocking request button 213 in FIG. 10 is referred to as the undocking request button 513 in FIG. 25. The undocking request button 513 is pressed by the user in order to obtain the permission of the detachment of the optional component unit 221 from the compact bay case 104. A signal output by the undocking request button 513 is supplied through the NOT gate 514 to the AND gate 515. A signal LEDON# which is set in the low state when the undocking indicator LED is turned on is supplied to the AND gate 515. The signal LEDON# is set in the high state when the undocking indicator LED is turned off.

The AND gate 515 performs an AND operation of the undocking request signal at the output of the NOT gate 514 and the LEDON# signal, and outputs a clock signal to a clock input CK of the flip-flop 516. A data input D of the flip-flop 516 is always retained in the high state.

The undocking request (or the interrupt request signal UNDKREQ#) is output from an inversion output Q# of the flip-flop 516 to the second control circuit 502 of the notebook PC 101. As shown in FIG. 25, the interrupt request signal UNDKREQ# is supplied through the diode 517 to the second control circuit 502 of the notebook PC 101. The diode 517 acts to perform the blocking of the interrupt request signal UNDKREQ# from the notebook PC 101 when the notebook PC 101 is set in the off state or the sleep state. The latch-up of the flip-flop 516 is avoided by the diode 517.

The second control circuit 502 includes, as shown in FIG. 25, an interrupt detection unit 521, a resistor 522, and a switch 523. The interrupt detection unit 521 is driven by the source power supplied by the power supply, and detects the presence of the undocking request (or the interrupt request signal UNDKREQ#) supplied by the first control circuit 501 when the supplied interrupt request signal UNDKREQ# is set in the low state. The resistor 522 is connected between the power supply of the interrupt detection unit 512 and the signal path of the interrupt request signal UNDKREQ#. The resistor 522 acts to pull up the signal path of the interrupt request signal UNDKREQ#. The diode 517 and the resistor 522 prevent the latch-up of the flip-flop 516 when the notebook PC 101 is set in the off state or the sleep state. The switch 523 is turned on or off in accordance with the PCI bus connection or the PCI bus isolation, and controls the supply of the undocking request (or the interrupt request signal UNDKREQ#) to the interrupt detection unit 521 on the signal path.

In the undocking request generating unit 500 of FIG. 25, when the undocking request button on the compact bay case 104 or the expansion station 102 is pressed by the user or when the undocking request icon on the display monitor of the notebook PC 101 is clicked by the user, the undocking request (the interrupt request signal UNDKREQ#) is output to the notebook PC 101 to permit detachment of the optional component unit 221 from the compact bay case 104 or detachment of the expansion station 102 from the notebook PC 101.

Figure 26:
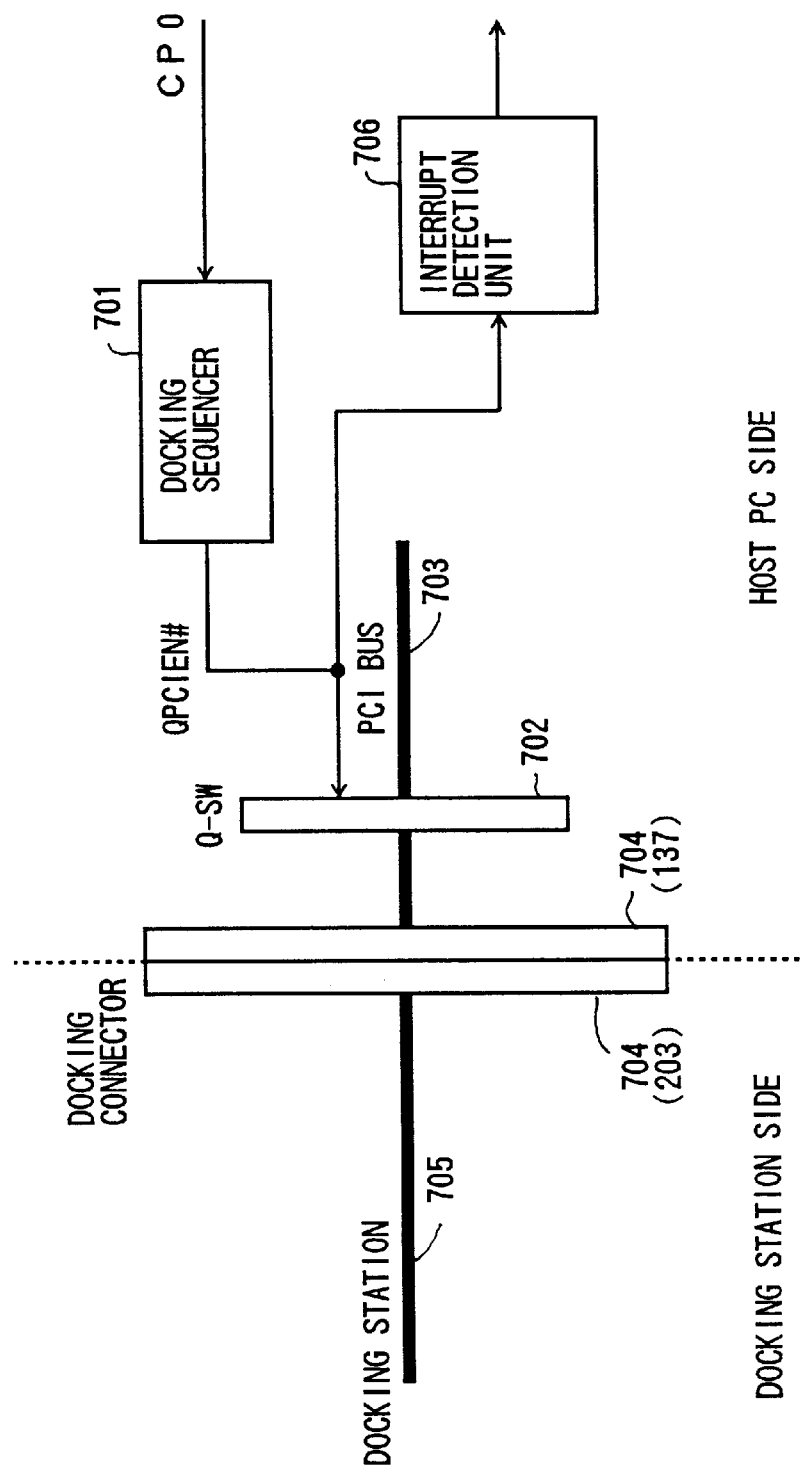
FIG. 26 is a diagram for explaining a bus connection control signal generated in the electronic equipment system.
Figures 27A, 27B:
FIG. 27A and FIG. 27B are time charts for explaining an operation of the electronic equipment system when a bus connection control signal is generated.

FIG. 26 shows a bus connection control signal QPCIEN# generated in the electronic equipment system 100. FIG. 27A and FIG. 27B are time charts for explaining an operation of the electronic equipment system 100 when a bus connection control signal QPCIEN# is generated. FIG. 27A shows the high/low state of the bus connection control signal QPCIEN#, and FIG. 27B shows the PCI bus connection state of the electronic equipment system 100.

As shown in FIG. 26, a bus connection control signal QPCIEN# is generated by a docking sequencer 701 which is provided in the control unit 225 of the notebook PC 101. The bus connection control signal QPCIEN# output by the docking sequencer 701 is supplied to both a switch (Q-SW) 702 and an interrupt detection unit 706.

The switch 702 is provided on a PCI bus 703 of the notebook PC 101, and the switch 702 is connected through the PCI bus 703 to a host-PC side connector 704 (which is, for example, the connector 137 of the notebook PC 101). The switch 702 is turned on or off in accordance with the high-low state of the bus connection control signal QPCIEN# output by the docking sequencer 701. When the bus connection control signal QPCIEN# is set in the high state, the switch 702 is turned on so as to connect the PCI bus 703 of the notebook PC 101 to a PCI bus 705 of the docking station (the compact bay case 104 or the expansion station 102) via the host-PC side connector 704 and a docking-station side connector 704. As shown in FIG. 27B, the PCI bus connection is established in this condition. When the bus connection control signal QPCIEN# is set in the low state, the switch 702 is turned off so as to disconnect the PCI bus 703 of the notebook PC 101 from the PCI bus 705 of the docking station (the compact bay case 104 or the expansion station 102). As shown in FIG. 27B, the PCI bus isolation is established in this condition.

As described above, the bus connection control signal QPCIEN# output by the docking sequencer 701 is supplied to the interrupt detection unit 706. The interrupt detection unit 706 detects a rising edge of the bus connection control signal QPCIEN# from the low state to the high state, and outputs a docking request which is used to carry out the docking process. The interrupt detection unit 706 detects a falling edge of the bus connection control signal QPCIEN# from the high state to the low state, and outputs an undocking request which is used to carry out the undocking process.

Next, a description will be given of a control of the undocking indicator LED on the docking station (the compact bay case 104 or the expansion station 102).

The undocking indicator LED when it is turned on provides an indication that the detachment of the optional component unit 221 from the compact bay case 104 or the detachment of the expansion station 102 from the notebook PC 101 is permitted by the notebook PC 101. The undocking indicator LED is turned on after the PCI bus isolation between the compact bay case 104 and the notebook PC 101 or the PCI bus isolation between the expansion station 102 and the notebook PC 101 is complete. The undocking indicator LED is turned off after the optional component unit 221 is detached from the compact bay case 104 or after the expansion station 102 is detached from the notebook PC 101. Also, the undocking indicator LED is turned off after a resuming operation is performed so that the electronic equipment system 100 changes from the suspended state S8 to the attached state S2.

Figure 28:
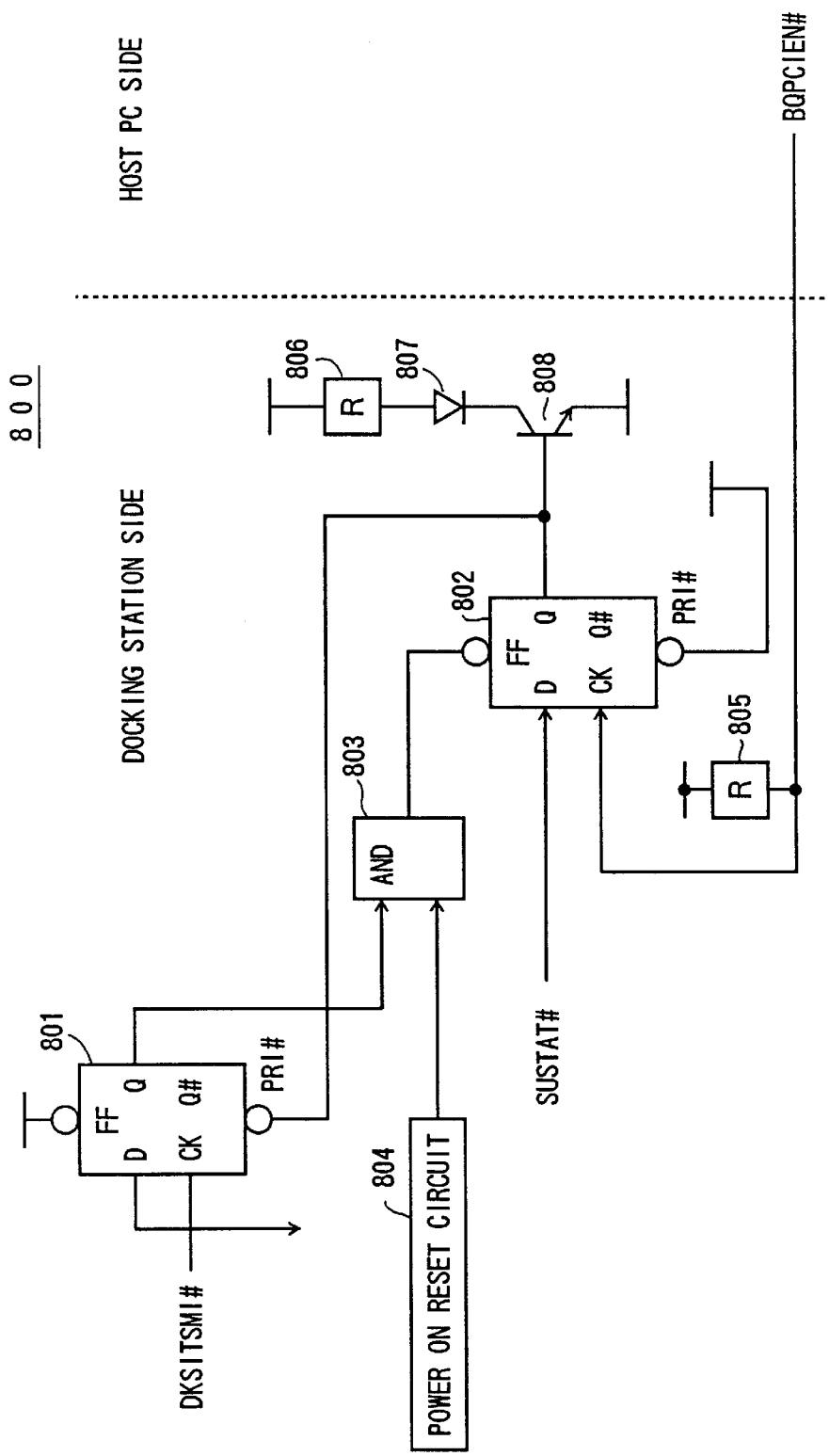
FIG. 28 is a circuit diagram of an undocking indicator LED control unit in the electronic equipment system.

FIG. 28 is a circuit diagram of an undocking indicator LED control unit 800 in the electronic equipment system 100.

As shown in FIG. 28, the undocking indicator LED control unit 800 is provided in the docking station which is either the compact bay case 104 or the expansion station 102. The undocking indicator LED control unit 800 includes a flip-flop 801, a flip-flop 802, an AND gate 803, a power-on reset circuit 804, a resistor 805, a resistor 806, a light emitting diode (LED) 807, and a transistor 808. The LED 807 corresponds to the undocking indicator LED on the docking station.

The interrupt request signal DKSITSMI# is supplied to a clock input of the flip-flop 801. An output signal in response to the interrupt request signal DKSITSMI# is output from a non-inversion output of the flip-flop 801, and the output signal from the flip-flop 801 is supplied to the AND gate 803. A power-on reset signal output by the power-on reset circuit 804 is supplied to the AND gate 803.

The AND gate 803 performs an AND operation of the output signal of the flip-flop 801 and the power-on reset signal, and outputs a reset signal to an input FF of the flip-flop 802 as a result of the AND operation.

A suspended-state signal SUSTAT# is supplied to a data input of the flip-flop 802, and a bus connection control signal QPCIEN# which is pulled up by the resistor 805 is supplied to a clock input of the flip-flop 802. The flip-flop 802 retains the suspended-state signal SUSTAT# in accordance with the bus connection control signal QPCIEN#.

An output signal is output from a non-inversion output of the flip-flop 802. The output signal of the flip-flop 802 is supplied to both a base of the transistor 808 and a preset input of the flip-flop 801. The transistor 808 is constituted by an NPN transistor. An emitter of the transistor 808 is set in the low state, and a collector of the transistor 808 is connected through the LED 807 and the resistor 806 to the power supply.

In the undocking indicator LED control unit 800 of FIG. 28, when the PCI bus isolation between the compact bay case 104 and the notebook PC 101 or the PCI bus isolation between the expansion station 102 and the notebook PC 101 is complete, the output signal of the flip-flop 802 is set in the high state, and the transistor 808 is turned on so that the current flows through the LED 807. Hence, the LED 807 is turned on to provide an indication that the detachment of the optional component unit 221 from the compact bay case 104 or the detachment of the expansion station 102 from the notebook PC 101 is permitted by the notebook PC 101. On the other hand, when the optional component unit 221 is detached from the compact bay case 104 or when the expansion station 102 is detached from the notebook PC 101, the output signal of the flip-flop 801 is set in the high state. The flip-flop 802 is reset by the output of the flip-flop 801, and the output signal of the flip-flop 802 is set in the low state. The transistor 808 is turned off so that the LED 807 is turned off.

As described above, in the electronic equipment system and the function-expansion device of the above-described embodiment, the optional component unit is detachable from the docking station when the docking station is connected to the electronic equipment which is in an operating condition. When the optional component unit in the function-expansion device is exchanged for a new component unit, it is not necessary to stop operation of the electronic equipment or turn off a power switch of the electronic equipment. It is possible to exchange the optional component unit for the new component unit even when the electronic equipment is operating. Accordingly, the electronic equipment system and function-expansion device of the above-described embodiment are effective in providing an adequate level of operability for the user.

The present invention is not limited to the above-described embodiments, and variations and modifications may be made without departing from the scope of the present invention.

Further, the present invention is based on Japanese priority application No. 10-260604, filed on Sep. 14, 1998, the entire contents of which are hereby incorporated by reference.

What is claimed is:

1. A function-expansion device detachably connected to electronic equipment to expand functions of the electronic equipment, comprising:

a first battery pack to supply power to at least the function-expansion device via the electronic equipment, the electronic equipment having a second battery pack, and the first and second battery packs having a common configuration;

a component unit providing an extended function of the electronic equipment; and a docking station having a first battery compartment therein accommodating one of the battery packs having the common configuration and the component unit detachably mounted with the docking station, the docking station connecting the component unit to the electronic equipment, the electronic equipment having a second battery compartment therein accommodating the other of the battery packs having the common configuration such that one of the battery packs is detachably connectable to one of the first and second battery compartments and the other of the battery packs is detachably connectable to a remaining one of the first and second battery compartments, wherein the component unit is detachable from the docking station when the docking station is attached to the electronic equipment which is in an operating condition, and wherein the function-expansion device outputs a notification signal to the electronic equipment when one of an event that the function-expansion device is connected to the electronic equipment and an event that the component unit is mounted on the docking station occurs.

2. The function-expansion device of claim 1, wherein the function-expansion device is configured such that the docking station is detachable from the electronic equipment.

3. The function-expansion device of claim 1, further comprising an undocking request generating unit outputting an undocking request to the electronic equipment to permit detachment of the component unit from the docking station.

4. The function-expansion device of claim 3, further comprising an undocking request button activating the undocking request generating unit, the undocking request generating unit requesting the electronic equipment to permit the detachment when the undocking request button is pressed by a user.

5. The function-expansion device of claim 3, further comprising an undocking acknowledge receiving unit receiving an undocking acknowledge signal from the electronic equipment, the acknowledge signal indicating that the electronic equipment has permitted the detachment.

6. The function-expansion device of claim 3, further comprising an undocking indicator providing an indication that the detachment of the component unit from the docking station is permitted.

7. The function-expansion device of claim 1, further comprising an undocking request generating unit outputting an undocking request to the electronic equipment to permit detachment of the docking station from the electronic equipment.

8. The function-expansion device of claim 7, further comprising an undocking request button activating the undocking request generating unit, the undocking request generating unit requesting the electronic equipment to permit the detachment when the undocking request button is pressed by a user.

9. The function-expansion device of claim 7, further comprising an undocking acknowledge receiving unit receiving an undocking acknowledge signal from the electronic equipment, the acknowledge signal indicating that the electronic equipment has permitted the detachment.

10. The function-expansion device of claim 7, further comprising an undocking indicator providing an indication that the detachment of the docking station from the electronic equipment is permitted.

11. The function-expansion device of claim 1, wherein the respective battery pack to mount in the first battery compartment of the docking station supplies the power to the component unit on the docking station and to the electronic equipment.

12. An electronic equipment system including a function-expansion device and electronic equipment, the function-expansion device detachably connected to the electronic equipment to expand functions of the electronic equipment, the function expansion device comprising:

a first battery pack to supply power to at least the function-expansion device via the electronic equipment, the electronic equipment having a second battery pack, and the first and second battery packs having a common configuration;

a component unit providing an extended function of the electronic equipment; and a docking station having a first battery compartment therein accommodating one of the battery packs having the common configuration and the component unit detachably mounted with the docking station, the docking station connecting the component unit to the electronic equipment, the electronic equipment having a second battery compartment therein accommodating the other of the battery packs having the common configuration such that one of the battery packs is detachably connectable to one of the first and second battery compartments and the other of the battery packs is detachably connectable to a remaining one of the first and second battery compartments, wherein the component unit is detachable from the docking station when the docking station is attached to the electronic equipment which is in an operating condition, wherein the function-expansion device outputs a notification signal to the electronic equipment when one of an event that the function-expansion device is connected to the electronic equipment and an event that the component unit is mounted on the docking station occurs, and wherein the electronic equipment comprises a connection circuit which detects the notification signal output by the function-expansion device.

13. A function-expansion device detachably connected to electronic equipment to expand functions of the electronic equipment, and a first battery pack to supply power to at least the function-expansion device via the electronic equipment, the electronic equipment having a second battery pack, and the first and second battery packs having a common configuration, comprising:
- a component unit providing an extended function of the electronic equipment; and
- a docking station having a first battery compartment therein to accommodate one of the battery packs and the component unit detachably mounted with the docking station, the docking station connecting the component unit to the electronic equipment, and the electronic equipment having a second battery compartment therein to accommodate the other of the battery packs having the common configuration such that the first and second battery packs are interchangeable between the first and second battery compartments and detachably connectable thereto,
- wherein the component unit is detachable from the docking station when the docking station is attached to the electronic equipment which is in an operating condition.

14. The function-expansion device of claim 13, further comprising an undocking request generating unit outputting an undocking request to the electronic equipment to permit detachment of the docking station from the electronic equipment.

15. The function-expansion device of claim 13, wherein the component unit includes one of a CD-ROM drive or a floppy disk drive.

16. An electronic equipment system including a function-expansion device and electronic equipment, the function-expansion device detachably connected to electronic equipment to expand functions of the electronic equipment, and a first battery pack to supply power to at least the function-expansion device via the electronic equipment, the electronic equipment having a second battery pack, and the first and second battery packs having a common configuration, the function-expansion device comprising:
- a component unit providing an extended function of the electronic system; and
- a docking station having a first battery compartment therein to accommodate one of the battery packs and the component unit detachably mounted with the docking station, the docking station connecting the component unit to the electronic equipment, and the electronic equipment having a second battery compartment therein to accommodate the other of the battery packs having the common configuration such that the first and second battery packs are interchangeable between the first and second battery compartments and detachably connectable thereto,
- wherein the component unit is detachable from the docking station when the docking station is attached to the electronic equipment which is in an operating condition.

17. A function-expansion device having an expansion unit providing expanded functions for an electronic system and detachably connected to electronic equipment of the electronic system, and a first battery pack to supply power to at least the function-expansion device via the electronic equipment, the electronic equipment having a second battery pack, and the first and second battery packs having a common configuration, the function-expansion device comprising:
- a docking station having a first battery compartment therein to accommodate one of the battery packs and the expansion unit detachably mounted with the docking station, the docking station connecting the expansion unit to the electronic equipment, the expansion unit being optionally detachable from the docking station, when the electronic equipment is attached to the docking station and in an operating condition, and the electronic equipment having a second battery compartment therein to accommodate the other of the battery packs having the common configuration such that the first and second battery packs are interchangeable between the first and second battery compartments and detachably connectable thereto.

18. The function-expansion device of claim 17, wherein the electronic equipment is a portable computer.

19. An electronic equipment system including a function-expansion device and electronic equipment, the function-expansion device having a component unit providing expand functions of the electronic system and detachably connected to the electronic equipment, and a first battery pack to supply power to at least the function-expansion device via the electronic equipment, the electronic equipment having a second battery pack, and the first and second battery packs having a common configuration, the function-expansion device comprising:
- a docking station with the expansion unit detachably mounted therewith, the docking station having a first battery compartment therein to accommodate one of the battery packs and connecting the expansion unit to the electronic equipment, the expansion unit being optionally detachable from the docking station, when the electronic equipment is attached to the docking station and in an operating condition, and the electronic equipment having a second battery compartment therein to accommodate the other of the battery packs having the common configuration such that the first and second battery packs are interchangeable between the first and second battery compartments and detachably connectable thereto.

20. The electronic equipment system of claim 19, wherein the electronic equipment is a portable computer.

21. A function-expansion device detachably connected to electronic equipment to expand functions of the electronic equipment, comprising:
- plural battery packs, one of which supplying power to at least the function-expansion device via the electronic equipment, each of the plural battery packs having a common configuration;
- a docking station having a first battery compartment therein accommodating one of the battery packs having the common configuration; and
- a component unit providing an extended function of the electronic equipment and detachably mounted with the docking station, the docking station connecting the component unit to the electronic equipment, the electronic equipment having a second battery compartment therein accommodating another one of the plural battery packs having the common configuration such that all of the battery packs are detachably and interchangeably connectable to the first and second battery compartments.

22. An electronic equipment system comprising:
electronic equipment; and
a function-expansion device detachably connected to the electronic equipment to expand functions of the electronic equipment, wherein the function expansion device comprises plural battery packs, one of which supplying power to at least the function-expansion device via the electronic equipment, each of the plural battery packs having a common configuration;

a docking station having a first battery compartment therein accommodating one of the battery packs having the common configuration; and a component unit providing an extended function of the electronic equipment and detachably mounted with the docking station, the docking station connecting the component unit to the electronic equipment, the electronic equipment having a second battery compartment therein accommodating another one of the plural battery packs having the common configuration such that all of the battery packs are detachably and interchangeably connectable to the first and second battery compartments.

* * * * *

UNITED STATES PATENT AND TRADEMARK OFFICE
CERTIFICATE OF CORRECTION

PATENT NO. : 6,742,070 B2  Page 1 of 1
DATED : May 25, 2004
INVENTOR(S) : Hidehiko Fuchida It is certified that error appears in the above-identified patent and that said Letters Patent is hereby corrected as shown below:

<u>Title page,</u>
Item [57], ABSTRACT,
Line 3, change "ezpansion" to -- expansion --.

Signed and Sealed this

Twenty-eighth Day of September, 2004

JON W. DUDAS
*Director of the United States Patent and Trademark Office*